(12) United States Patent
Chiu et al.

(10) Patent No.: US 12,155,217 B2
(45) Date of Patent: Nov. 26, 2024

(54) POWER SUPPLY DEVICE AND POWER SUPPLYING METHOD

(71) Applicant: INDUSTRIAL TECHNOLOGY RESEARCH INSTITUTE, Hsinchu (TW)

(72) Inventors: Chien-Chi Chiu, Tainan (TW); Yuh-Fwu Chou, Zhubei (TW); Yin-Wen Tsai, Zhubei (TW); Chih-Wei Hsu, Zhudong Township (TW); Ku-Yen Kang, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 69 days.

(21) Appl. No.: 18/071,703

(22) Filed: Nov. 30, 2022

(65) Prior Publication Data

US 2023/0216307 A1 Jul. 6, 2023

(30) Foreign Application Priority Data

Dec. 30, 2021 (TW) ................................ 110149623

(51) Int. Cl.
*H02J 3/38* (2006.01)
*B60L 50/75* (2019.01)
(Continued)

(52) U.S. Cl.
CPC ......... *H02J 3/381* (2013.01); *H01M 8/04597* (2013.01); *H01M 8/04932* (2013.01);
(Continued)

(58) Field of Classification Search
CPC .. H02J 3/381; H02J 3/46; H02J 7/0047; H02J 7/00712; H02J 7/34; H02J 2300/30;
(Continued)

(56) References Cited

U.S. PATENT DOCUMENTS 9,475,480 B2 * 10/2016 Ishishita ............... H02J 7/0071
10,230,245 B2    3/2019 Adest et al.
(Continued)

FOREIGN PATENT DOCUMENTS

CN        1917324 A    2/2007
CN      100452512 C    1/2009
(Continued)

OTHER PUBLICATIONS

Office Action issued in TW Application No. 110149623, dated Oct. 28, 2022.
(Continued)

*Primary Examiner* — Hal Kaplan
(74) *Attorney, Agent, or Firm* — Birch, Stewart, Kolasch & Birch, LLP

(57) ABSTRACT

A power supply includes fuel cell, secondary battery, power converter, current detecting unit and control unit. The power converter couples the fuel cell with the secondary battery, and is adapted to convert current outputted by the fuel cell into output current. The current detecting unit couples the power converter with the secondary battery and adapted to detect charging current of the output current transferred to the secondary battery. The control unit couples the current detecting unit with the power converter and is adapted to: when the charging current is greater than a charging current upper-limit-setting value of the secondary battery, a down-adjustment signal is outputted to the power converter to reduce the output current; and when the charging current is less than the charging current upper-limit-setting value, an up-adjustment signal is outputted to the power converter to increase the output current.

17 Claims, 12 Drawing Sheets

(51) Int. Cl.
| | |
|---|---|
| *H01M 8/04537* | (2016.01) |
| *H01M 8/04858* | (2016.01) |
| *H01M 10/48* | (2006.01) |
| *H01M 16/00* | (2006.01) |
| *H02J 3/46* | (2006.01) |
| *H02J 7/00* | (2006.01) |
| *H02J 7/34* | (2006.01) |

(52) U.S. Cl.
CPC ......... *H01M 10/48* (2013.01); *H01M 16/006* (2013.01); *H02J 3/46* (2013.01); *H02J 7/0047* (2013.01); *H02J 7/00712* (2020.01); *H02J 7/34* (2013.01); *B60L 50/75* (2019.02); *H01M 2220/20* (2013.01); *H01M 2250/20* (2013.01); *H02J 2300/30* (2020.01)

(58) Field of Classification Search
CPC ......... H01M 8/04597; H01M 8/04932; H01M 10/48; H01M 16/006; H01M 2220/20; H01M 2250/20; B60L 50/75
USPC .......................................................... 307/72
See application file for complete search history.

(56) References Cited

U.S. PATENT DOCUMENTS

| | | |
|---|---|---|
| 2011/0101920 A1 | 5/2011 | Seo et al. |
| 2011/0127958 A1 | 6/2011 | Ishishita et al. |
| 2012/0176097 A1 | 7/2012 | Takezawa et al. |

FOREIGN PATENT DOCUMENTS

| | | |
|---|---|---|
| CN | 101515723 A | 8/2009 |
| CN | 101640429 A | 2/2010 |
| CN | 102089179 A | 6/2011 |
| CN | 106848347 A | 6/2017 |
| CN | 108367685 A | 8/2018 |
| JP | 2-291668 A | 12/1990 |
| JP | 6022145 B2 | 11/2016 |
| KR | 10-2005-0047221 A | 5/2005 |
| TW | 200633342 A | 9/2006 |
| TW | I274454 B | 2/2007 |
| TW | 200814418 A | 3/2008 |
| TW | 201225473 A1 | 6/2012 |
| TW | I532294 B | 5/2016 |
| TW | M525304 U | 7/2016 |
| TW | 202011662 A | 3/2020 |
| WO | WO 02/097909 A1 | 12/2002 |
| WO | WO 2007/086472 A1 | 8/2007 |
| WO | WO 2011/015931 A1 | 2/2011 |
| WO | WO 2019/058869 A1 | 3/2019 |

OTHER PUBLICATIONS

Taiwanese Office Action and Search Report for corresponding Taiwanese Application No. 111146012, dated Jun. 7, 2023.

* cited by examiner

The voltage measured at the first electrode terminal 120a of the secondary battery 120

The current measured at the first electrode terminal 120a of the secondary battery 120

The voltage measured at the first electrode terminal 110a of the fuel cell 110 (S31) and the power output of the fuel cell 110 through the power converter 130 (S32)

Required power of the load 10

POWER SUPPLY DEVICE AND POWER SUPPLYING METHOD

This application claims the benefit of Taiwan application Serial No. 110149623, filed Dec. 30, 2021, the subject matter of which is incorporated herein by reference.

TECHNICAL FIELD

The disclosure relates in general to a power supply device and power supplying method.

BACKGROUND

In the classification of the fuel cell hybrid system, the fuel cell is equipped with a DC power converter, and an output terminal of the fuel cell is equipped with a secondary battery to provide current required for instantaneous change of load. Such architecture has the advantages of low cost, good protection for the secondary battery, low system complexity and high matching degree of load peak, but it has the problem of poor management and control ability of the secondary battery.

The above-mentioned problems mainly occur in the situation: the fuel cell equipped with the DC power converter cannot provide instantaneous energy when the load changes rapidly, and the secondary battery connected with an output terminal of the DC power converter supplies power in time, and the DC power converter will charge the secondary battery with the maximum current when the load current is stably reduced or even cut off. Such phenomenon will cause the system device to generate the protection: the DC power converter charges the secondary battery with the maximum current, just like the DC power converter encounters the maximum capacitive load, and thus it is easy to cause the output protection of the DC power converter, or damage or burnout resulted from repeated protection and release protection. The above are the characteristics and applications of the power converter that must be avoided. The situation seen on the secondary battery side is very likely to activate the charging overcurrent protection. Once the protection is activated, the secondary battery will stop charging, and such phenomenon is not an ideal solution.

SUMMARY

According to an embodiment, a power supply device is provided. The power supply device includes a fuel cell, a secondary battery, a power converter, a current detection unit and a control unit. The power converter couples the fuel cell with the secondary battery and is configured to convert current output by the fuel cell into an output current. The current detection unit couples the power converter with the secondary battery and is configured to detect charging current of the output current which is transmitted to the secondary battery. The control unit couples the current detection unit with the power converter and is configured to: when the charging current is greater than a charging current upper-limit-setting value of the secondary battery, output a down-adjustment signal to the power converter for reducing the output current; and when the charging current is less than the charging current upper-limit-setting value, output an up-adjustment signal to the power converter for increasing the output current.

According to another embodiment, a power supplying method is provided. The power supplying method includes the following steps: converting current output by a fuel cell of a power supply device into an output current by a power converter of the power supply device, wherein the power converter couples the fuel cell with a secondary battery; detecting a charging current of the output current transferred to the secondary battery from the power converter by a current detection unit of the power supply device, wherein the current detection unit couples the power converter with the secondary battery; outputting a down-adjustment signal to the power converter for reducing the output current by a control unit of the of the power supply device when the charging current is greater than a charging current upper-limit-setting value of the secondary battery, wherein the control unit couples the current detection unit with the power converter; and outputting an up-adjustment signal to the power converter for increasing the output current by the control unit when the charging current is less than the charging current upper-limit-setting value.

The above and other aspects of the disclosure will become better understood with regard to the following detailed description of the preferred but non-limiting embodiment (s). The following description is made with reference to the accompanying drawings.

Figure 1:
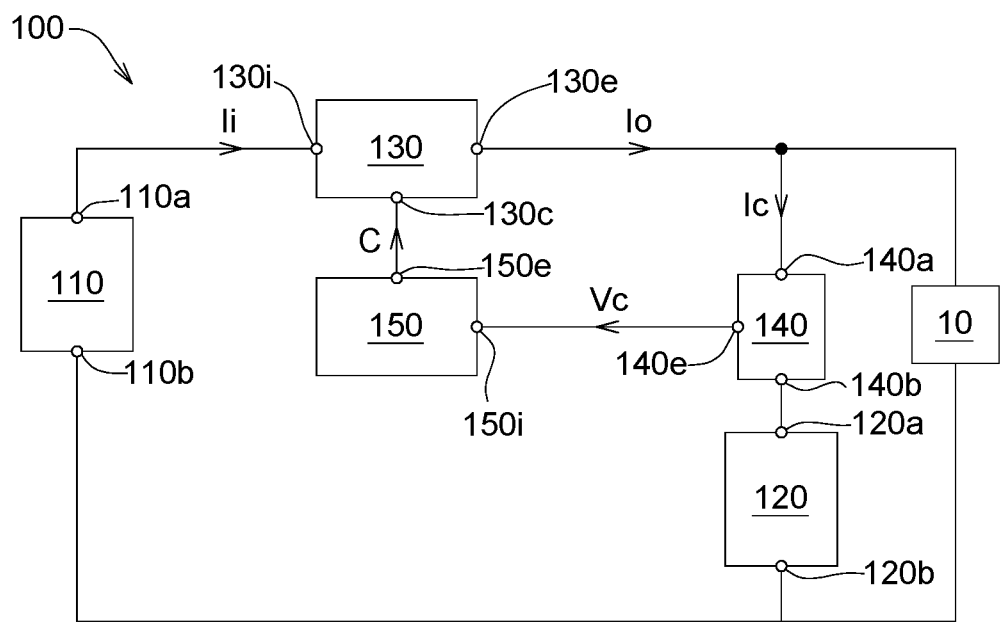
FIG. 1 is a schematic diagram of a power supply device according to an embodiment of the present disclosure.

In the following detailed description, for purposes of explanation, numerous specific details are set forth in order to provide a thorough understanding of the disclosed embodiments. It will be apparent, however, that one or more embodiments could be practiced without these specific details. In other instances, well-known structures and devices are schematically shown in order to simplify the drawing.

DETAILED DESCRIPTION

Figure 2:
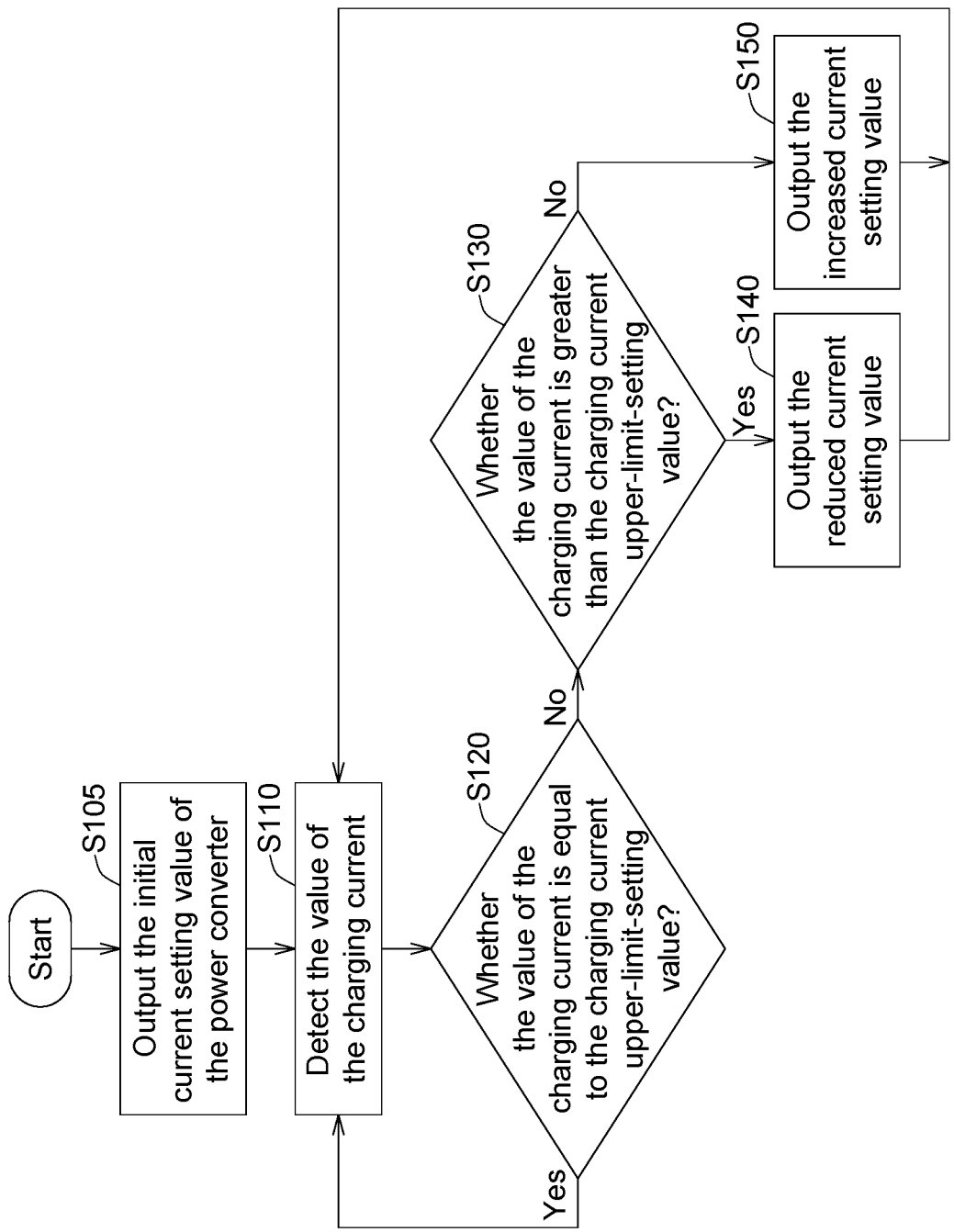
FIG. 2 is a flowchart of a power supplying method of the power supply device of FIG. 1.
Figure 3:
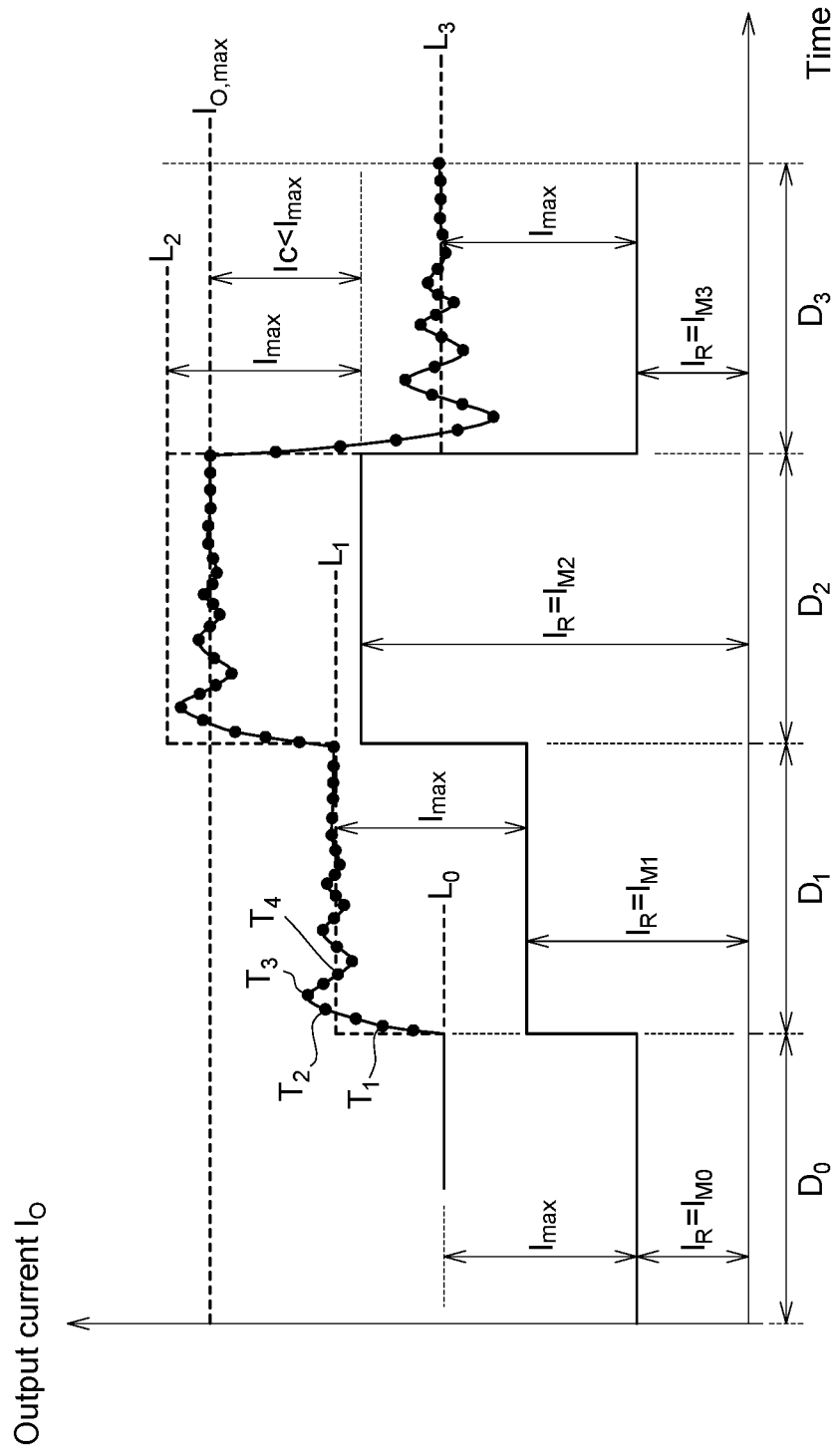
FIG. 3 is a schematic diagram of the power converter of FIG. 1 outputting charging current.
Figure 4:
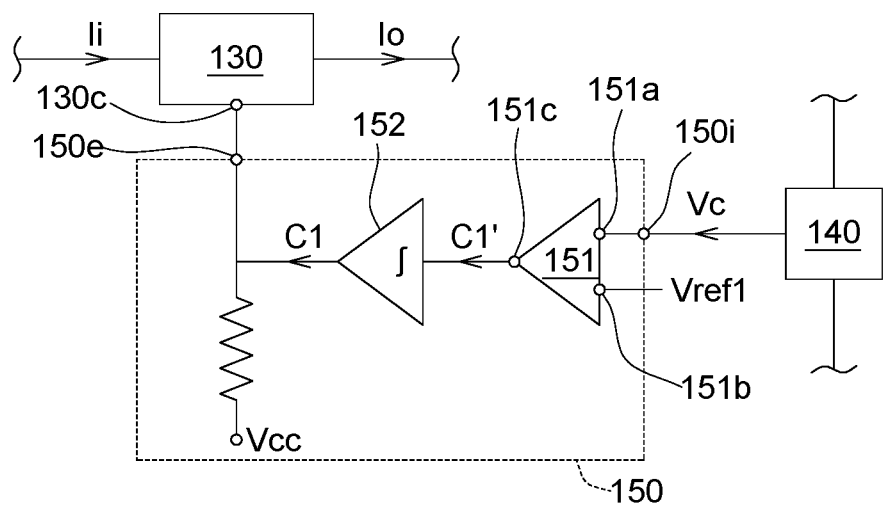
FIG. 4 is a schematic diagram of an embodiment of a control unit of FIG. 1.

Referring to FIGS. 1 to 4, FIG. 1 is a schematic diagram of a power supply device 100 according to an embodiment of the present disclosure, FIG. 2 is a flowchart of a power supplying method of the power supply device 100 of FIG. 1, and FIG. 3 is a schematic diagram of a power converter 130 of FIG. 1 outputting charging current $I_C$, and FIG. 4 is a schematic diagram of an embodiment of a control unit 150 of FIG. 1.

The power supply device 100 could be coupled to a load 10. The load 10 is, for example, a device that requires electric power, such as an electric locomotive, an electric vehicle, an electric bicycle, an electric boat, and an unmanned aerial vehicle.

The power supply device 100 includes a fuel cell 110, a secondary battery 120, a power converter 130, a current detection unit 140 and a control unit 150. The power converter 130 couples the fuel cell 110 with the secondary battery 120. The power converter 130 is configured to convert the current $I_i$ output by the fuel cell 110 (the current $I_i$ is input current for the power converter 130) into the output current $I_O$. The current detection unit 140 couples the power converter 130 with the secondary battery 120 and is configured to detect a charging current $I_C$ that shares part of the output current $I_O$ and transmitted to the secondary battery 120. The control unit 150 couples to the current detection unit 140 and the power converter 130 and is configured to output a down-adjustment signal $C_D$ to the power converter 130 when the charging current $I_C$ is higher than (or equal to) a charging current upper-limit-setting value $I_{max}$, wherein the converter 130 accordingly reduces the output current $I_O$. The control unit 150 is further configured to output an up-adjustment signal $C_U$ to the power converter 130 when the charging current $I_C$ is less than the charging current upper-limit-setting value $I_{max}$, wherein the power converter 130 accordingly increases the output current $I_O$. The down-adjustment signal $C_D$ and the up-adjustment signal $C_U$ are collectively referred to herein as a control signal C (shown in FIG. 1).

In the embodiment of the present disclosure, the secondary battery 120 is configured to compensate the deficiency and absorbs the excess of output power from the fuel cell 110, and accordingly it could increase the usage of the load 10, such as the sailing time or sailing itinerary. The power supply device 100 of the disclosed embodiment has a simple structure and light weight, which could provide the load 10 with a large voltage range and satisfy the required peak power of the load 10, and is suitable to be used in aircraft, such as general aircraft, fixed-wing aircraft, or airships, etc.

In addition, if the secondary battery 120 is subjected to the charging current $I_C$ that is higher than (or equal to) the charging current upper-limit-setting value $I_{max}$, it will cause low lifespan of the secondary battery 120, or damage to the secondary battery 120. Since the power converter 130 of the disclosed embodiment could be controlled to limit the charging current $I_C$ to not exceed the charging current upper-limit-setting value $I_{max}$, the lifespan of the secondary battery 120 could be increased. In an embodiment, the secondary battery 120 has a maximum charging power (performance/capability of the secondary battery), and the charging current upper-limit-setting value $I_{max}$ is not greater than the maximum charging current upper-limit value corresponding to the maximum charging power. In an embodiment, the charging current upper-limit-setting value $I_{max}$ is, for example, a value equal to or less than the charging current when the charging rate of the secondary battery 120 is "1C", wherein "1C" represents the value of the charging current required to fully charge the secondary battery 120 in one hour.

As shown in FIG. 1, in terms of connection relationship, the power converter 130 has an output terminal 130e, an input terminal 130i and a control terminal 130c. The fuel cell 110 has a first electrode terminal 110a and a second electrode terminal 110b, wherein the first electrode terminal 110a is, for example, a positive electrode, and the second electrode terminal 110b is, for example, a negative electrode. The secondary battery 120 has a first electrode terminal 120a and a second electrode terminal 120b, wherein the first electrode terminal 120a is, for example, a positive electrode, and the second electrode terminal 120b is, for example, a negative electrode. The control unit 150 has an input terminal 150i and an output terminal 150e. As shown in the figure, the output terminal 130e of the power converter 130 is coupled to the load 10, the input terminal 130i is coupled to the first electrode terminal 110a of the fuel cell 110, and the control terminal 130c is coupled to the control unit 150 for receiving the control signal C from the control unit 150 (for example, the down-adjustment signal $C_D$ or the up-adjustment signal $C_U$). The second electrode terminal 120b of the secondary battery 120 is coupled to the second electrode terminal 110b of the fuel cell 110. The current detection unit 140 has a first terminal 140a, a second terminal 140b and an output terminal 140e, wherein the first terminal 140a is coupled to the output terminal 130e of the power converter 130, and the second terminal 140b is coupled to the first electrode terminal 120a of the secondary battery 120, and the output terminal 140e is coupled to the control unit 150 for outputting the detected charging current $I_C$ to the control unit 150. In an embodiment, the current detection unit 140 converts the value of the detected charging current $I_C$ into a voltage signal value $V_C$ corresponding to the charging current $I_C$. The input terminal 150i of the control unit 150 is coupled to the output terminal 140e of the current detection unit 140 for receiving the signal (for example, the charging voltage value $V_C$) related to the charging current $I_C$ from the current detection unit 140, and the output terminal 150e is coupled to the control terminal 130c of the power converter for transmitting the control signal C (for example, a control level signal) of the output current to the power converter 130.

The power converter 130 could convert the input current $I_i$ provided by the fuel cell 110 into the output current $I_O$. The power converter 130 is, for example, a boost converter, a buck converter, or a buck-boost converter, so that the output current $I_O$ could be greater than, equal to or less than the input current $I_i$. In an embodiment, the power converter 130 is, for example, a DC/DC converter. The power converter 130 has the maximum output power (which is the performance/capability of the power converter 130), the secondary battery 120 has the maximum charging power (which is the performance/capability of the secondary battery 120), wherein the maximum charging power of the secondary battery 120 could be less than the maximum output power of the power converter 130.

FIGS. 2 and 3 show the schematic diagrams of the power converter 130 controlling the output current $I_O$ according to the charging current upper-limit-setting value $I_{max}$. Steps S105 to S150 in FIG. 2 could be performed once every interval, and the solid circles shown in FIG. 3 represent the time points of performing steps S105 to S150 each time. The output current $I_O$ in FIG. 3 is the output current of the power converter 130. In different time intervals $D_0$, $D_1$, $D_2$ and $D_3$, the stable levels $L_0$, $L_1$, $L_2$, and $L_3$ required for the output current $I_O$ to be controlled changes with the change of the required current $I_R$ (for example, $I_{M0}$, $I_{M1}$, $I_{M2}$, $I_{M3}$ in FIG. 3) of the load 10, wherein the levels $L_0$, $L_1$, $L_2$, and $L_3$ are corresponding to sum of the required current $I_R$ and the charging current upper-limit-setting value $I_{max}$ each time interval ($D_0$, $D_1$, $D_2$ and $D_3$), that is, $L_0=I_{M0}+I_{max}$, $L_1=I_{M1}+I_{max}$, $L_2=I_{M2}+I_{max}$, $L_3=I_{M3}+I_{max}$. However, when the required control level (for example, $L_2$) of the output current $I_O$ exceeds the maximum output current $I_{O,\,max}$ of the power converter 130 (for example, in time interval $D_2$), the output current $I_O$ of the power converter 130 controls the level setting value will not exceed the maximum output current $I_{O,\,max}$. In addition, the flow of the power supplying method of the power supply device of the other embodiments of the present disclosure is similar to or the same as the flow of FIG. 2.

Firstly, in step S105, the control unit 150 could output an initial current setting value of the power converter 130, so that the power converter 130 outputs a predetermined current value, wherein the predetermined current value is not greater than the maximum charging current of the secondary battery 120. In addition, the predetermined current value could be preset as the minimum output current of the power converter 130.

In step S110, the current detection unit 140 detects the value of the charging current $I_C$ that the output current $I_O$ of the power converter 130 is transferred to (shunted to) the secondary battery 120.

In step S120, the control unit 150 determines whether the value of the charging current $I_C$ is equal to the charging current upper-limit-setting value $I_{max}$. Since the current detection unit 140 merely detects the charging current $I_C$ (that is, $I_C=I_O-I_R$) that the output current $I_O$ of the power converter 130 is transferred to the secondary battery 120, and thus the upper-limit of the output current $I_O$ will vary with the rise and fall of the required current $I_R$ of the load 10. When the value of the charging current $I_C$ is equal to the charging current upper-limit-setting value $I_{max}$, the process returns to step S110 to continue to detect the value of the charging current $I_C$. When the value of the charging current $I_C$ is not equal to the charging current upper-limit-setting value $I_{max}$, the process proceeds to step S130.

In step S130, the control unit 150 determines whether the value of the charging current $I_C$ is greater than the charging current upper-limit-setting value $I_{max}$. When the value of the charging current $I_C$ is greater than the charging current upper-limit-setting value $I_{max}$, the process proceeds to step S140. When the value of the charging current $I_C$ is not greater than (for example, less than) the charging current upper-limit-setting value $I_{max}$, the process proceeds to step S150.

In step S140, the control unit 150 outputs a reduced current setting value (that is, the down-adjustment signal $C_D$) to the power converter 130, so that the power converter 130 accordingly reduces the output current $I_O$ to protect the secondary battery 120.

In step S150, the control unit 150 outputs an increased current setting value (that is, the up-adjustment signal $C_U$) to the power converter 130, so that the power converter 130 could accordingly increase the output current $I_O$ to increase the charging current $I_C$ for the secondary battery 120 and/or increase power supply to the load 10 under the circumstances of not causing damage (overload) to the power converter 130.

According to the process shown in FIG. 2, when the charging current $I_C$ does not reach the charging current upper-limit-setting value $I_{max}$ (for example, the time point T1 in FIG. 3), the charging current $I_C$ for the secondary battery 120 is equal to the difference of the output current $I_O$ of the power converter 130 and the required current $I_R$ of the load 10 (that is, $I_C=I_O-I_R$), wherein the output current $I_O$ could be equal to or less than the maximum output current $I_{O,\,max}$ corresponding to the maximum output power (which is the performance/capability of the power converter 130) of the power converter 130. Referring to the time interval $D_2$ in FIG. 3, when the required current $I_R$ of the load 10 is greater than the difference of the maximum output current $I_{O,\,max}$ of the power converter 130 and the charging current upper-limit-setting value $I_{max}$ of the secondary battery 120 (that is, $I_R>I_{O,\,max}-I_{max}$), the control level setting value of the output current $I_O$ of the power converter 130 will be limited by the maximum output current $I_{O,\,max}$, so that the secondary battery 120 cannot be charged with the charging current upper-limit-setting value $I_{max}$ as the maximum charging current (that is, $I_C=I_{O,\,max}-I_R<I_{max}$). At this time, the maximum charging current that could be supplied to the secondary battery 120 is less than the charging current upper-limit-setting value $I_{max}$ of the charging current. In FIG. 3, in other time periods $D_0$, $D_1$ or $D_3$, when the charging current $I_C$ reaches or exceeds the charging current upper-limit-setting value $I_{max}$ (for example, in the time point T2 in FIG. 3), the charging current $I_C$ for the secondary battery 120 is limited to not exceed the charging current upper-limit-setting value $I_{max}$, so that the output current $I_O$ of the power converter 130 is equal to the sum of the charging current upper-limit-setting value $I_{max}$ and the required current $I_R$ of the load 10 (that is, $I_O=I_{max}+I_R$), and, at this time, the output current $I_O$ of the power converter 130 has not yet reached the maximum output current $I_{O,\,max}$.

As shown in FIG. 3, according to the aforementioned principle, once the charging current $I_C$ of the secondary battery 120 is greater than the charging current upper-limit-setting value $I_{max}$ (for example, in the time point T2), the charging current $I_C$ will be controlled to decrease (for example, in the time point T3) until the charging current $I_C$ is less than the charging current upper-limit-setting value $I_{max}$ (for example, in time point T4), thereby protecting the secondary battery 120 and prevent the secondary battery 120 from being damaged by the excessive charging current $I_C$. On the contrary, once the charging current $I_C$ of the secondary battery 120 is less than the charging current upper-limit-setting value $I_{max}$, the power converter 130 could increase the output current $I_O$ to increase the charging current $I_C$ of the secondary battery 120. As a result, the control for the output current $I_O$ by the power converter 130 generally fluctuates slightly up and down relative to the charging current upper-limit-setting value $I_{max}$, as shown in FIG. 3.

As shown in FIG. 4, the control unit 150 includes a first comparator 151 and a first integrator 152. The first comparator 151 has a first comparison input terminal 151a, a first comparison reference terminal 151b and a first comparison output terminal 151c. The first comparison input terminal 151a is coupled to the current detection unit 140 for receiving the voltage signal value $V_C$ corresponding to the charging current $I_C$ from the current detection unit 140, and the first comparison reference terminal 151b refers to the voltage signal upper-limit-setting value $V_{ref1}$ of the maximum charging current corresponding to the charging current upper-limit-setting value $I_{max}$, and the first comparison output terminal 151c is coupled to the first integrator 152, and the first comparator 151 could output a first comparison result voltage value C1' (subtraction operation) of the voltage signal value $V_C$ corresponding to the charging current $I_C$ and the voltage signal upper-limit-setting value $V_{ref1}$ corresponding to the maximum charging current of the charging current upper-limit-setting value $I_{max}$ through the first comparison output terminal 151c. The first integrator 152 is coupled to the output terminal 150e of the control unit 150, a line between the DC voltage level (or DC voltage potential) $V_{cc}$ and the first comparison output terminal 151c of the first comparator 151. The first integrator 152 could integrate the first comparison result voltage value C1' at each time point into a first voltage integration value C1 to provide the output current setting value (that is, the control signal C) for the power converter 130. The power converter 130 controls the output current $I_O$ according to the first voltage integration value C1. For example, the greater the first voltage integration value C1 is, the greater the output current $I_O$ of the power converter 130 is, and vice versa.

Figure 5:
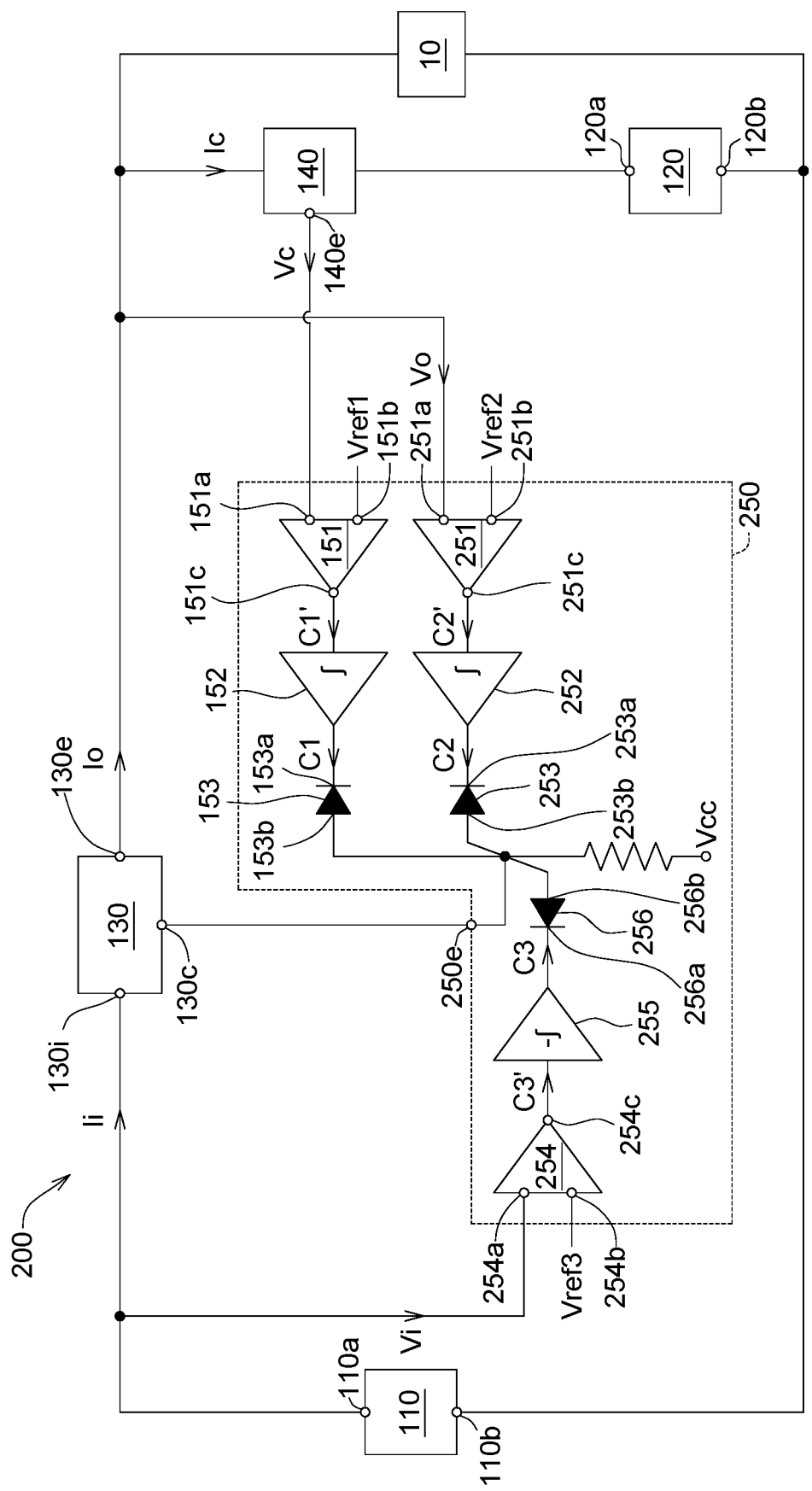
FIG. 5 is a schematic diagram of a power supply device according to another embodiment of the present disclosure.

Referring to FIG. 5, FIG. 5 is a schematic diagram of a power supply device 200 according to another embodiment of the present disclosure.

The power supply device 200 includes the fuel cell 110, the secondary battery 120, the power converter 130, the current detection unit 140 and a control unit 250. The power supply device 200 includes the features the same as or similar to that of the power supply device 100 expect that the control unit 250 includes the first comparator 151, the first integrator 152, the first diode 153, a second comparator 251, a second integrator 252, second diode 253, third comparator 254, third integrator 255 and a third diode 256.

The first comparator 151 has a first comparison input terminal 151a, a first comparison reference terminal 151b and a first comparison output terminal 151c. The first comparison input terminal 151a is coupled to the current detection unit 140 for receiving the voltage signal value $V_C$ corresponding to the charging current $I_C$ from the current detection unit 140. The first comparison reference terminal 151b refers to the voltage signal upper-limit-setting value $V_{ref1}$ corresponding to the maximum charging current of the charging current upper-limit-setting value $I_{max}$. The first comparison output terminal 151c is coupled to the first integrator 152, and the first comparator 151 could output a first comparison result voltage value C1' of the voltage signal value $V_C$ corresponding to the charging current $I_C$ and the voltage signal upper-limit-setting value $V_{ref1}$ corresponding to the maximum charging current of the charging current upper-limit-setting value $I_{max}$ through the first comparison output terminal 151c. The first integrator 152 is coupled to the first electrode terminal 153a of the first diode 153 and the first comparison output terminal 151c of the first comparator 151. The first integrator 152 could integrate the first comparison result voltage value C1' at each time point (that is, several of the first comparison result voltage values C1') into the first voltage integration value C1. The second electrode terminal 153b of the first diode 153 is coupled to a line between the output terminal 250e of the control unit 250 and the DC voltage level $V_{cc}$.

The second comparator 251 has a second comparison input terminal 251a, a second comparison reference terminal 251b and a second comparison output terminal 251c. The second comparison input terminal 251a is coupled to the output terminal 130e of the power converter 130 for detecting the output voltage $V_O$ of the power converter 130, the second comparison reference terminal 251b refers to the output voltage upper-limit-setting value $V_{ref2}$ of the power converter 130, and the second comparison output terminal 251c is coupled to the second integrator 252, wherein the second comparator 251 could output a second comparison result voltage value C2' (subtraction operation) of the value of the output voltage $V_O$ of the power converter 130 and the output voltage upper-limit-setting value $V_{ref2}$ through the second comparison output terminal 251c. The second integrator 252 couples the first electrode terminal 253a of the second diode 253 with the second comparison output terminal 251c of the second comparator 251. The second integrator 252 could integrate the second comparison result voltage value C2' at each time point (that is, several of the second comparison result voltage values C2') into a second voltage integration value C2. The second electrode terminal 253b of the second diode 253 is coupled to a line between the output terminal 250e of the control unit 250 and the DC voltage level $V_{cc}$.

The third comparator 254 has a third comparison input terminal 254a, a third comparison reference terminal 254b and a third comparison output terminal 254c. The third comparison input terminal 254a is coupled to the input terminal 130i of the power converter 130 to detect the value of an input voltage $V_i$ (that is, the output voltage of the fuel cell 110) of the power converter 130, and the third comparison reference terminal 254b refers to the output voltage lower-limit-setting value $V_{ref3}$ (is input voltage for the power converter 130) of fuel cell 110, and the third comparison output terminal 254c is coupled to the third integrator 255, and the third comparator 254 could output a third comparison result voltage value C3' of the value of the input voltage $V_i$ and the output voltage lower-limit-setting value $V_{ref3}$ through the third comparison output terminal 254c. The third integrator 255 couples to the first electrode terminal 256a of the third diode 256 and the third comparison output terminal 254c of the third comparator 254. The third integrator 255 could integrate the third comparison result voltage value C3' at each time point (that is, several of the third comparison result voltage values C3') into a third voltage integration value C3. The second electrode terminal 256b of the third diode 256 is coupled to a line between the output terminal 250e of the control unit 250 and the DC voltage level $V_{cc}$. As shown in FIG. 5, the third integrator 255 is different to the first integrator 152 or the second integrator 252 with an addition negative sign to control the input terminal 130i of the power converter 130 above a lower-limit-setting value $V_{ref3}$ but not control it below the lower-limit-setting value $V_{ref3}$.

The power converter 130 could control the output current $I_O$ according to the first voltage integration value C1, the second voltage integration value C2 and the third voltage integration value C3. For example, the power converter 130 could control the output current $I_O$ according to one of the first voltage integration value C1, the second voltage integration value C2 and the third voltage integration value C3. That is, the first voltage integration value C1, the second voltage integration value C2 and the third voltage integration value C3 all could be used as the control signal C to control the output current $I_O$ of the power converter 130.

As shown in FIG. 5, due to the first diode 153, the second diode 253 and the third diode 256 being electrically connected to the DC voltage level $V_{cc}$ in common, only the minimum one (the diode connected to the minimum one is subjected to forward bias voltage to be conducted, but the other diodes are subjected to reverse bias voltage to be non-conducted) of the first voltage integration value C1, the second voltage integration value C2 and the third voltage integration value C3 could be electrically with the DC voltage level $V_{cc}$, such that the minimum one is transmitted to the power converter 130 through the conductive path. The aforementioned control signal C includes one of the voltage integration values C1, C2 and C3, for example, the minimum one of the voltage integration values C1, C2 and C3, which could be a signal for increasing or decreasing the output current $I_O$.

The power converter 130 controls the output current $I_O$ according to the minimum one of the voltage integration values, and it will be further illustrated below.

When the voltage signal value $V_C$ corresponding to the charging current $I_C$ is less than the voltage signal upper-limit-setting value $V_{ref1}$ corresponding to the maximum charging current of the charging current upper-limit-setting value $I_{max}$, the first comparison output terminal 151c outputs a high-level signal, and the first voltage integration value C1 continue increasing accordingly with the voltage signal value $V_C$ corresponding to charging current $I_C$ continuing (evolving with the time axis of FIG. 3) being less than the voltage signal upper-limit-setting value $V_{ref1}$ corresponding to the maximum charging current of the charging current upper-limit-setting value $I_{max}$. Conversely, when the voltage signal value $V_C$ corresponding to the charging current $I_C$ is greater than the voltage signal upper-limit-setting value $V_{ref1}$ corresponding to the maximum charging current of the charging current upper-limit-setting value $I_{max}$, the first voltage integration value C1 continues decreasing accordingly with the voltage signal value $V_C$ corresponding to charging current $I_C$ continuing being greater than the voltage signal upper-limit-setting value $V_{ref1}$ corresponding to the maximum charging current of the charging current upper-limit-setting value $I_{max}$.

When the value of the output voltage $V_O$ is less than the output voltage upper-limit-setting value $V_{ref2}$, the second comparison output terminal 251c outputs the high-level signal, and the second voltage integration value C2 continues increasing accordingly with the value of the output voltage $V_O$ continuing (evolving with the time axis of FIG. 3) being less than the output voltage upper-limit-setting value $V_{ref2}$. On the contrary, When the value of the output voltage $V_O$ is greater than the output voltage upper-limit-setting value $V_{ref2}$, the second voltage integration value C2 continues decreasing accordingly with the value of the output voltage $V_O$ continuing being greater than the output voltage upper-limit-setting value $V_{ref2}$.

When the value of the input voltage $V_i$ is greater than the output voltage lower-limit-setting value $V_{ref3}$, the third comparison output terminal 254c outputs a low-level signal, and the third voltage integration value C3 continues increasing accordingly with the value of the input voltage $V_i$ continuing (evolving with the time axis of FIG. 3) being greater than the output voltage lower-limit-setting value $V_{ref3}$. On the contrary, when the value of the input voltage $V_i$ is less than the output voltage lower-limit-setting value $V_{ref3}$, the third voltage integration value C3 continues decreasing accordingly with the value of the input voltage $V_i$ continuing being less than the output voltage lower-limit-setting value $V_{ref3}$.

When the voltage signal value $V_C$ corresponding to the charging current $I_C$ is greater than the voltage signal upper-limit-setting value $V_{ref1}$ corresponding to the maximum charging current of the charging current upper-limit-setting value $I_{max}$ (that is, $V_C > V_{ref1}$), it means that the power converter 130 needs to reduce the output current $I_O$ for preventing the charging current $I_C$ provided to the secondary battery 120 from exceeding the charging current upper-limit-setting value $I_{max}$ and damaging the secondary battery 120. Due to the power converter 130 controlling the output current $I_O$ according to the minimum one of the first voltage integration value C1, the second voltage integration value C2 and the third voltage integration value C3, if neither the control of the second voltage integration value C2 nor the control of the third voltage integration value C3 for the power converter 130 make the charging current $I_C$ of the output current $I_O$ supplied to the secondary battery 120 be less than or equal to the charging current upper-limit-setting value $I_{max}$, the first voltage integration value C1 will takes control of the power converter 130 with the decreasing of the first voltage integration value C1, such that the output current $I_O$ of the power converter 130 is forced to reduce until the charging current $I_C$ of the secondary battery 120 supplied by the output current $I_O$ is less than or equal to the charging current upper-limit-setting value $I_{max}$. Similarly, when the output voltage $V_O$ is greater than the output voltage upper-limit-setting value $V_{ref2}$, it means that the power converter 130 needs to reduce the output current $I_O$ for preventing the lifespan of the secondary battery 120 from being degraded due to an excessively high charging voltage. Due to the power converter 130 controlling the output current $I_O$ according to the minimum one of the first voltage integration value C1, the second voltage integration value C2 and the third voltage integration value C3, if neither the control of the first voltage integration value C1 nor the control of the third voltage integration value C3 for the power converter 130 make the output voltage $V_O$ be less than or equal to the output voltage upper-limit-setting value $V_{ref2}$, the second voltage integration value C2 will takes control of the power converter 130 with the decreasing of the second voltage integration value C2, such that the output current $I_O$ of the power converter 130 is forced to reduce (also reduces the output voltage $V_O$) until the output voltage $V_O$ is less than or equal to the output voltage upper-limit-setting value $V_{ref2}$. Similarly, when the input voltage $V_i$ of the power converter 130 (that is, the input voltage for the fuel cell 110) is less than the output voltage lower-limit-setting value $V_{ref3}$, it means that the power converter 130 needs to reduce the input current $I_i$ to increase the input voltage $V_i$ for avoiding the lifespan loss due to the fuel cell 110 operating in low output voltage. Due to the power converter 130 controlling the output current $I_O$ according to the minimum one of the first voltage integration value C1, the second voltage integration value C2 and the third voltage integration value C3, if neither the control of the first voltage integration value C1 nor the control of the second voltage integration value C2 for the power converter 130 make the input voltage $V_I$ be greater than or equal to the output voltage lower-limit-setting value $V_{ref3}$, the third voltage integration value C3 will takes control of the power converter 130 with the decreasing of the third voltage integration value C3, such that the output current $I_O$ of the power converter 130 is forced to reduce (also increase the input voltage $V_i$) until the input voltage $V_i$ is greater than or equal to the output voltage lower-limit-setting value $V_{ref3}$.

In an embodiment, the output current $I_O$ controlled by the power converter 130 is proportional to the minimum one of the voltage integration values C1, C2 and C3, for example, linear relationship; however, such exemplification is not meant to be for limiting. The voltage value of the input terminal 130c of the power converter 130 is limited by the DC voltage level $V_{cc}$. When any (the exceeding one) of the first voltage integration value C1, the second voltage integration value C2 and the third voltage integration value C3 exceeds the DC voltage level $V_{cc}$, the diode 153, 253 or 256 connected to the exceeding one will generate reverse bias which could block the voltage higher than the DC voltage level $V_{cc}$ from transmitting to the input terminal 130c. As a result, the voltage of the input terminal 130c of the power converter 130 could be limited not to exceed the DC voltage level $V_{cc}$, so as to prevent the power converter 130 from outputting current more than expected value or causing damage to the power converter 130. When the minimum one of the first voltage integration value C1, the second voltage integration value C2 and the third voltage integration value C3 is less than the DC voltage level $V_{cc}$, the diode 153, 253 or 256 connected to the minimum one will generate forward bias while the diodes connected to other non-minimum one generate reverse biased, so that the voltage value of the input terminal 130c is approximately equal to the minimum one of the first voltage integration value C1, the second voltage integration value C2 and the third voltage integration value C3 (ignoring the voltage drop of the forward bias of the diodes). For example, when the minimum value of the voltage integration values C1, C2 and C3 is substantially equal to the DC voltage level $V_{cc}$, the output current $I_O$ of the power converter 130 is 100% of the maximum output current (that is, the maximum output current); when the minimum one of the voltage integration values C1, C2 and C3 is equal to P% of the DC voltage level $V_{cc}$, and the output current $I_O$ of the power converter 130 is P% of the maximum output current, wherein the P is, for example, an integer less than 100.

In addition, through setting the output voltage lower-limit-setting value $V_{ref3}$ and the output voltage upper-limit-setting value $V_{ref2}$, the operating range of the fuel cell 110 and the maximum charging voltage of the secondary battery 120 could be determined respectively. For example, the output voltage lower-limit-setting value $V_{ref3}$ could be set according to an ohmic polarization region, so that the fuel cell 110 operates in the ohmic polarization region. When the fuel cell 110 operates in the ohmic polarization region, the higher the operating voltage is, the higher the efficiency is, but the lower the output power is. On the contrary, the lower the operating voltage is, the lower the efficiency is, and the more waste heat is generated although more current and power could be provided, which may cause local overheating and reduce the performance or lifespan of the fuel cell 110. The output voltage upper-limit-setting value $V_{ref2}$ could be set according to the safe charging voltage range of the secondary battery 120, so as to select a safe charging voltage upper-limit condition in the range with sufficient charging capacity.

Figure 6:
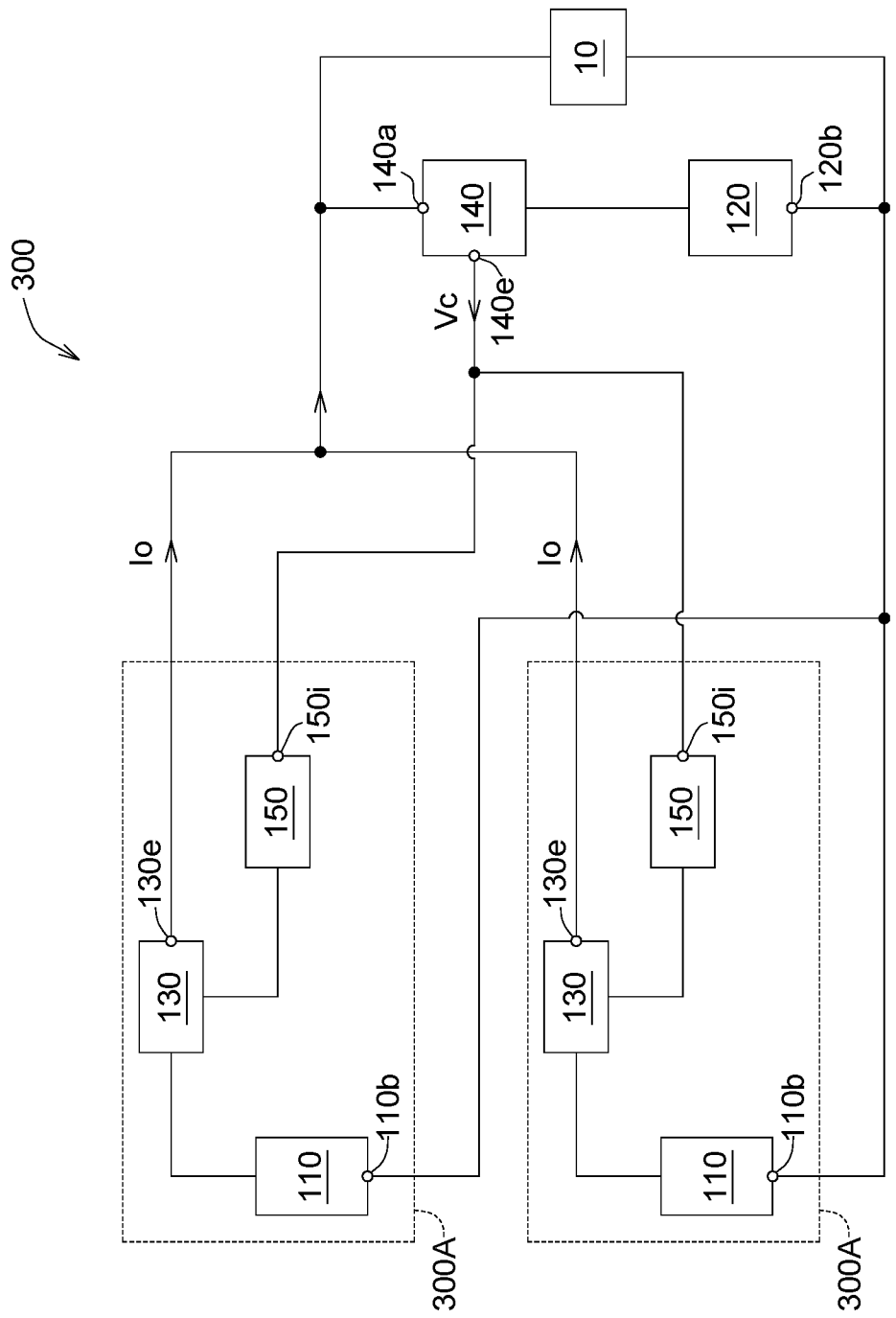
FIG. 6 is a schematic diagram of a power supply device according to another embodiment of the present disclosure.

Referring to FIG. 6, FIG. 6 is a schematic diagram of a power supply device 300 according to another embodiment of the present disclosure. The power supply device 300 includes a number of the fuel cells 110, the secondary battery 120, a number of the power converters 130, the current detection unit 140 and a number of the control units 150. In another embodiment, at least one control unit 150 of the power supply device 300 could be replaced by the aforementioned control unit 250.

As shown in FIG. 6, the power supply device 300 includes a number of power supply modules 300A each including the fuel cell 110, the power converter 130 and the control unit 150. In each power supply module 300A, the second electrode terminal 110b of the fuel cell 110 is coupled to the second electrode terminal 120b of the secondary battery 120, the input terminal 150i of the control unit 150 is coupled to the output terminal 140e of the current detection unit 140, and the output terminal 130e of the power converter 130 is coupled to the first terminal 140a of the current detection unit 140.

As shown in FIG. 6, the current detection unit 140 transmits the detected voltage signal value $V_C$ corresponding to the charging current $I_C$ to the control unit 150 of each power supply module 300A, so that each power supply module 300A increases or decreases the respective output current $I_O$ according to the voltage signal value $V_C$ corresponding to the charging current $I_C$.

Figure 7A:
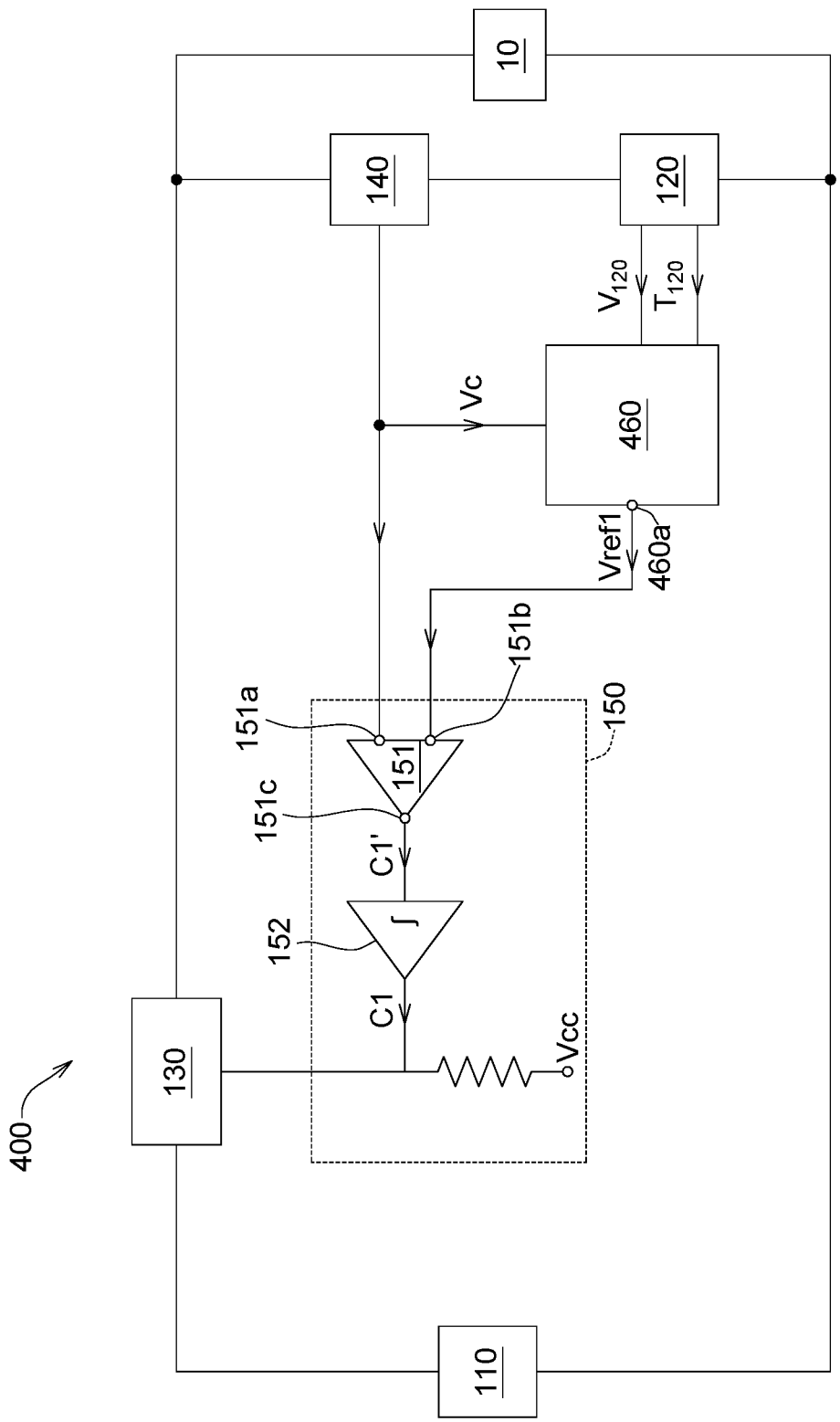
FIG. 7A is a schematic diagram of a power supply device according to another embodiment of the present disclosure.
Figure 7B:
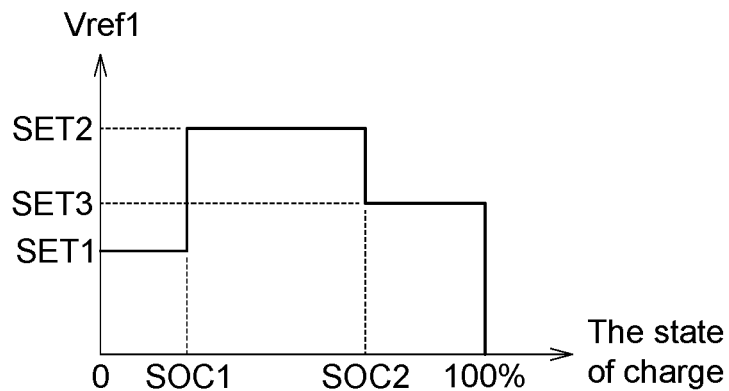
FIG. 7B is a schematic diagram of the voltage signal upper-limit-setting value of FIG. 7A corresponding to the maximum charging current is determined according to the state of charge (SOC) of the secondary battery.
Figure 7C:
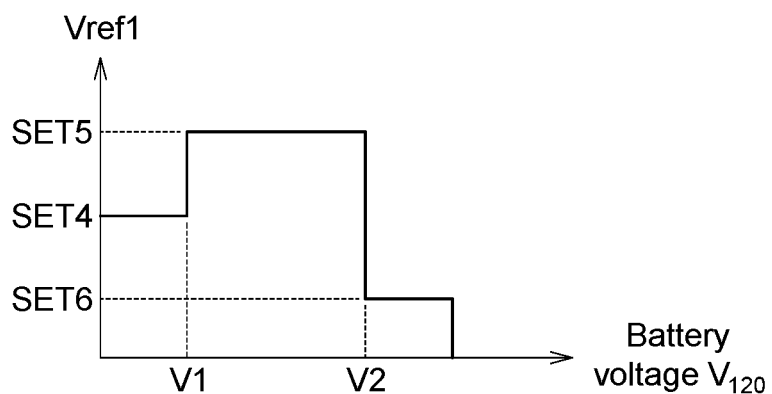
FIG. 7C is a schematic diagram of the voltage signal upper-limit-setting value of FIG. 7A corresponding to the maximum charging current is determined according to a battery voltage.
Figure 7D:
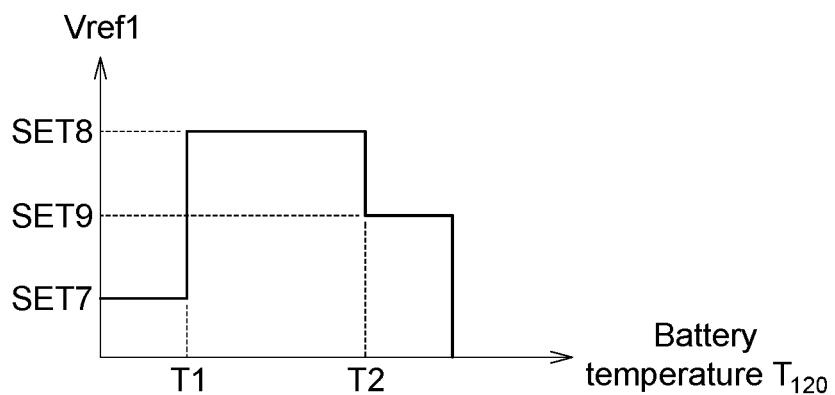
FIG. 7D is a schematic diagram of the voltage signal upper-limit-setting value of FIG. 7A corresponding to the maximum charging current is determined according to a battery temperature.

Referring to FIGS. 7A to 7D, FIG. 7A is a schematic diagram of a power supply device 400 according to another embodiment of the present disclosure, FIG. 7B is a schematic diagram of the voltage signal upper-limit-setting value $V_{ref1}$ of FIG. 7A corresponding to the maximum charging current is determined according to the state of charge (SOC) of the secondary battery 120, FIG. 7C is a schematic diagram of the voltage signal upper-limit-setting value $V_{ref1}$ of FIG. 7A corresponding to the maximum charging current is determined according to a battery voltage $V_{120}$, and FIG. 7D is a schematic diagram of the voltage signal upper-limit-setting value $V_{ref1}$ of FIG. 7A corresponding to the maximum charging current is determined according to a battery temperature $T_{120}$.

The power supply device 400 includes the fuel cell 110, the secondary battery 120, the power converter 130, the current detection unit 140, the control unit 150 and a reference voltage regulator 460. In another embodiment, the control unit 150 of the power supply device 400 could be replaced by the aforementioned control unit 250.

The reference voltage regulator 460 is coupled to the secondary battery 120 for detecting or receiving the battery voltage $V_{120}$ and/or the battery temperature $T_{120}$ of the secondary battery 120, and the reference voltage regulator 460 is coupled to the current detection unit 140 for receiving the voltage signal value $V_C$ corresponding to the charging current $I_C$ detected by the current detection unit 140. The reference voltage regulator 460 could determine the voltage signal upper-limit-setting value $V_{ref1}$ corresponding to the maximum charging current according to at least one of the battery voltage $V_{120}$, the battery temperature $T_{120}$ and the voltage signal value $V_C$ corresponding to the charging current $I_C$. The reference voltage regulator 460 has a voltage terminal 460a, and the first comparison reference terminal 151b of the first comparator 151 is coupled to the voltage terminal 460a, so that the first comparison reference terminal 151b could refer to the voltage signal upper-limit-setting value $V_{ref1}$ corresponding to the maximum charging current.

In an embodiment, as shown in FIG. 7B, when the SOC of the secondary battery 120 is less than the first SOC value SOC1, the voltage signal upper-limit-setting value $V_{ref1}$ corresponding to the maximum charging current is the first setting value SET1. When the SOC of the secondary battery 120 ranged between the first SOC value SOC1 and a second SOC value SOC2, the voltage signal upper-limit-setting value $V_{ref1}$ corresponding to the maximum charging current is a second setting value SET2. When the SOC of the secondary battery 120 is greater than the second SOC value SOC2, the voltage signal upper-limit-setting value $V_{ref1}$ corresponding to the maximum charging current is a third setting value SET3. The first SOC value SOC1 is less than the second SOC value SOC2, the second setting value SET2 is greater than the first setting value SET1 and the third setting value SET3, and the third setting value SET3 is greater than, equal to or less than the first setting value SET1.

In another embodiment, as shown in FIG. 7C, when the battery voltage $V_{120}$ of the secondary battery 120 is less than the first voltage value V1, the voltage signal upper-limit-setting value $V_{ref1}$ corresponding to the maximum charging current is the fourth setting value SET4. When the battery voltage $V_{120}$ of the secondary battery 120 ranges between the first voltage value V1 and a second voltage value V2, the voltage signal upper-limit-setting value $V_{ref1}$ corresponding to the maximum charging current is a fifth setting value SET5. When the battery voltage $V_{120}$ of the secondary battery 120 is greater than the second voltage value V2, the voltage signal upper-limit-setting value $V_{ref1}$ corresponding to the maximum charging current is a sixth setting value SET6. The first voltage value V1 is less than the second voltage value V2, the fifth setting value SET5 is greater than the fourth setting value SET4 and the sixth setting value SET6, and the fourth setting value SET4 is greater than, equal to, or less than the sixth setting value SET6.

In another embodiment, as shown in FIG. 7D, when the battery temperature $T_{120}$ of the secondary battery 120 is lower than a first temperature value T1, the voltage signal upper-limit-setting value $V_{ref1}$ corresponding to the maximum charging current is a seventh setting value SET7. When the battery temperature $T_{120}$ of the secondary battery 120 ranges between the first temperature value T1 and a second temperature value T2, the voltage signal upper-limit-setting value $V_{ref1}$ corresponding to the maximum charging current is an eighth setting value SET8. When the battery temperature $T_{120}$ of the secondary battery 120 greater than the second temperature value T2, the voltage signal upper-limit-setting value $V_{ref1}$ corresponding to the maximum charging current is equal to a ninth setting value SET9. The first temperature value T1 is less than the second temperature value T2, the eighth setting value ET8 is greater than the seventh setting value SET7 and the ninth setting value SET9, and the seventh setting value SET7 is greater than, equal to or less than the ninth setting value SET9.

Figure 8:
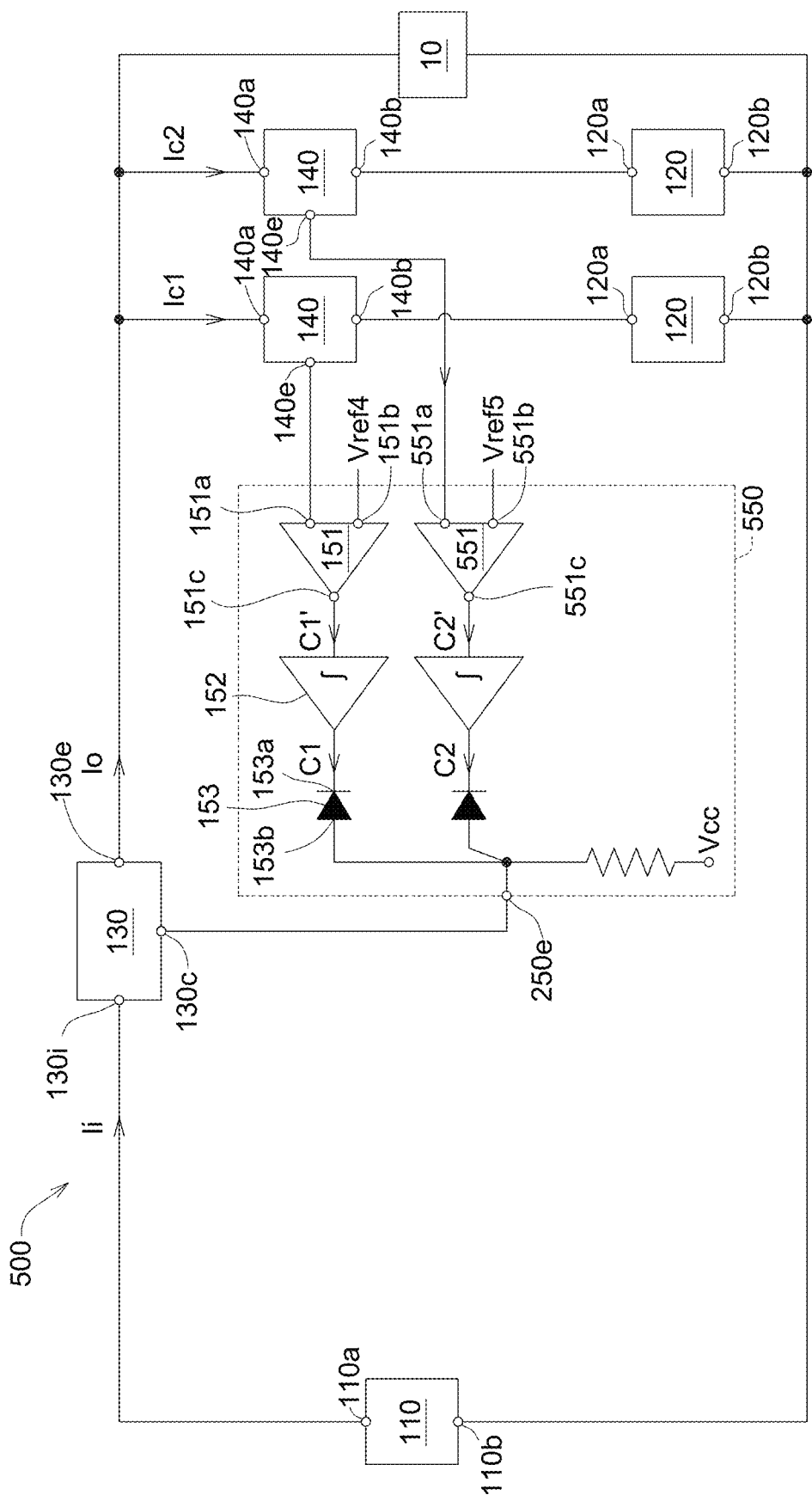
FIG. 8 is a schematic diagram of a power supply device according to another embodiment of the present disclosure.

Referring to FIG. 8, FIG. 8 is a schematic diagram of a power supply device 500 according to another embodiment of the present disclosure. The power supply device 500 includes the fuel cell 110, a number of the secondary batteries 120, the power converter 130, a number of the current detection units 140, the control unit 550 and a number of the comparators (for example, the first comparator 151 and the second comparator 551).

As shown in FIG. 8, each current detection unit 140 couples to the corresponding secondary battery 120 and output terminal 130e of the power converter 130. The number of the current detection units 140 in the present embodiment is equal to that of the secondary batteries 120, and the numbers of the current detection units 140 and the numbers of the secondary batteries 120 are not limited to two, and they may be more than two. Furthermore, the connected current detection unit 140 and secondary battery 120 could form a module, the power supply device 500 includes a number of the modules, and the modules are connected in parallel to receive the electric current from power converter 130 and/or to provide the electric current required by the load 10.

A comparator input terminal of each comparator (for example, the first comparator 151 or the second comparator 551) is coupled to the corresponding current detection unit 140, and a comparator output terminal of each comparator (for example, the first comparator 151 or the second comparator 551) is coupled to the control unit 150.

As shown in FIG. 8, the first comparator 151 has the first comparison input terminal 151a, the first comparison reference terminal 151b and the first comparison output terminal 151c. The first comparison input terminal 151a is coupled to one of the current detection units 140 to receive a voltage signal value $V_{C1}$, detected by the current detection unit 140, corresponding to the charging current $I_{C1}$. The first comparison reference terminal 151b refers to the voltage signal upper-limit-setting value $V_{ref4}$ corresponding to the maximum charging current of the secondary battery 120 connected to the current detection unit 140, the first comparison output terminal 151c could output a first comparison result voltage value C1' of the voltage signal value $V_{C1}$ corresponding to the charging current $I_{C1}$ and the voltage signal upper-limit-setting value $V_{ref4}$ corresponding to maximum charging current. The second comparator 551 has a second comparison input terminal 551a, a second comparison reference terminal 551b and a second comparison output terminal 551c. The second comparison input terminal 551a is coupled to another one of the current detection units 140 for receiving a voltage signal value $V_{C2}$, detected by the current detection unit 140, corresponding to the charging current $I_{C2}$, the second comparison reference terminal 551b refers to the voltage signal upper-limit-setting value $V_{ref5}$ corresponding to the maximum charging current of the secondary battery 120 connected to the current detection unit 140, and the second comparison output terminal 551c could output the second comparison result voltage value C2' of the voltage signal value $V_{C2}$ corresponding to the charging current $I_{C2}$ and the voltage signal upper-limit-setting value $V_{ref5}$ corresponding to the maximum charging current.

In the present embodiment, a number of the secondary batteries 120 have the same or different properties. Depending on the charging performance characteristics of the secondary battery 120, the voltage signal upper-limit-setting value $V_{ref4}$ corresponding to the maximum charging current and the voltage signal upper-limit-setting value $V_{ref5}$ corresponding to the maximum charging current could be the same or different.

As shown in FIG. 8, in these secondary batteries 120, through the voltage setting of the voltage signal upper-limit-setting values $V_{ref4}$ and $V_{ref5}$, when one of the charging currents $I_{C1}$ and $I_{C2}$ first reaches its charging current upper-limit-setting value $I_{max}$, the corresponding secondary battery 120 could make the control unit 150 reduce the output current $I_O$.

Figure 9:
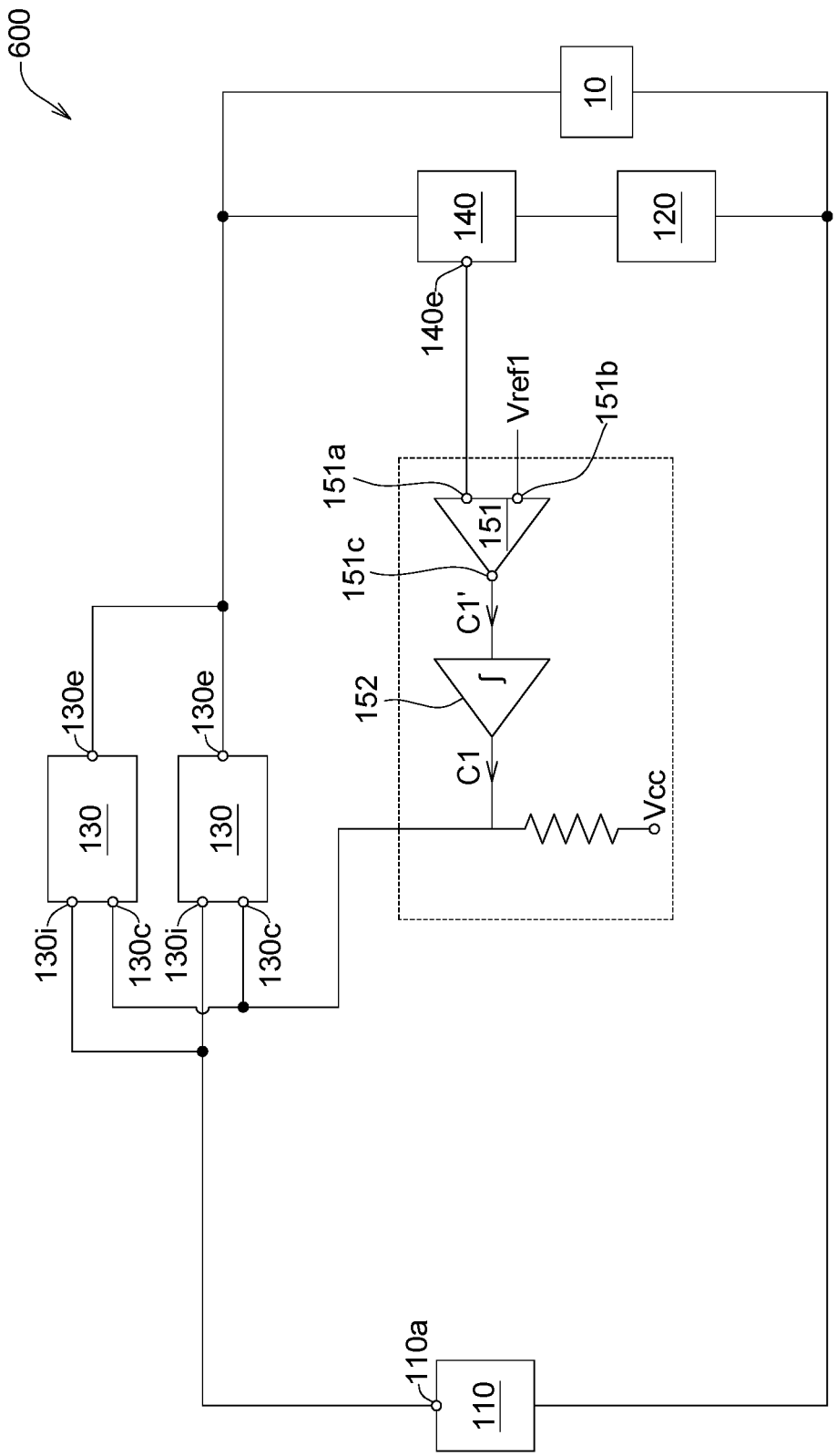
FIG. 9 is a schematic diagram of a power supply device according to another embodiment of the present disclosure.

Referring to FIG. 9, FIG. 9 is a schematic diagram of a power supply device 600 according to another embodiment of the present disclosure. The power supply device 600 includes the fuel cell 110, the secondary battery 120, a number of the power converters 130, the current detection unit 140 and the control unit 150. In another embodiment, the control unit 150 of the power supply device 600 could be replaced by the aforementioned control unit 250.

As shown in FIG. 9, the power converters 130 are connected between the fuel cell 110 and the current detection unit 140 in parallel. The number of power converters 130 is not limited to two, and it could be more than two. In the present embodiment, the power supply device 600 controls a number of the power converters 130 using one current detection unit 140.

Figure 10:
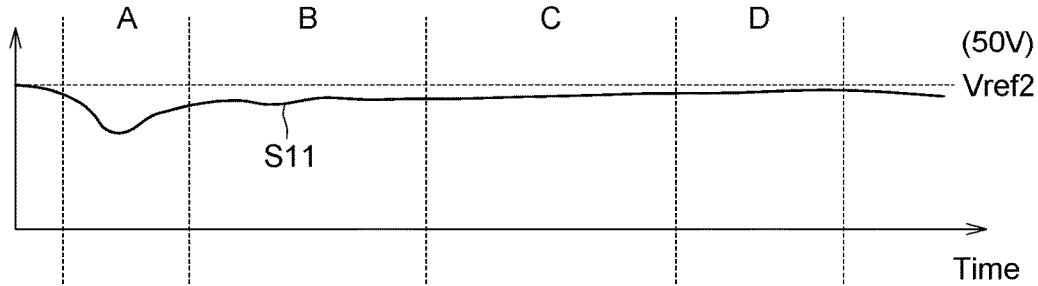
FIG. 10 is a schematic diagram of a first power supply state of the power supply device in FIG. 5.
Figure 10:
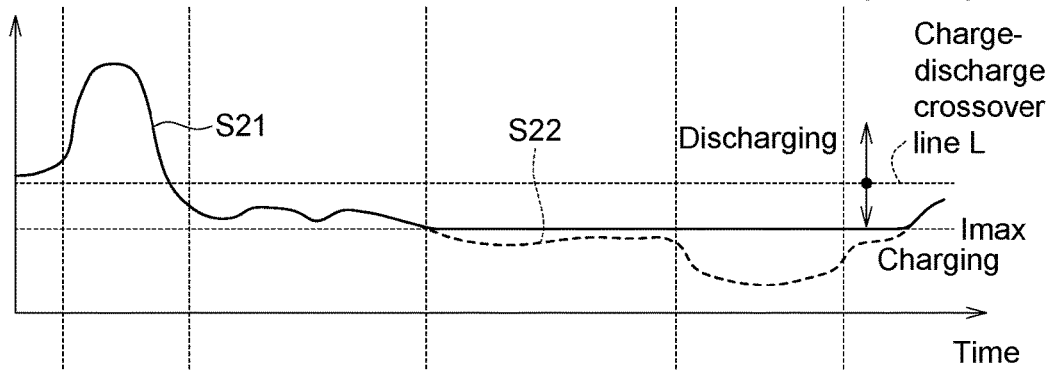
Figure 10:
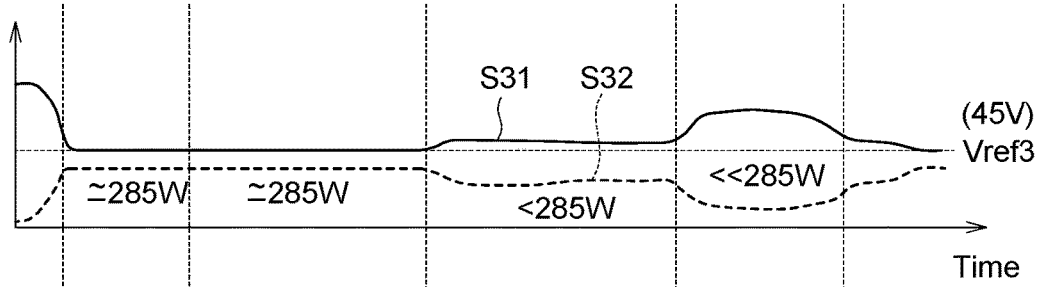
Figure 10:
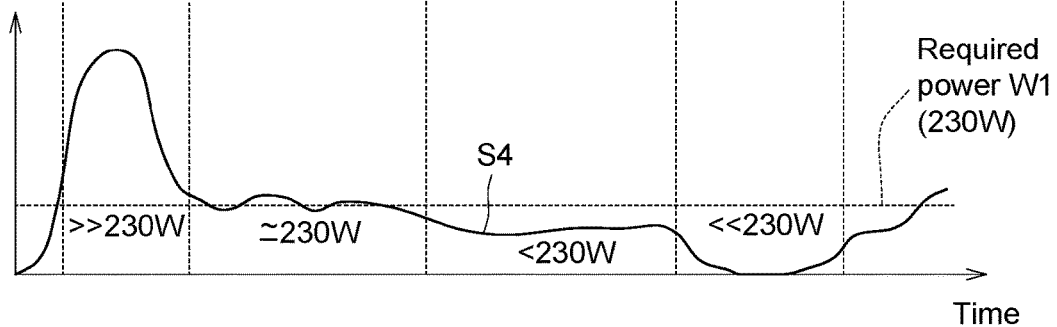

Referring to FIG. 10, FIG. 10 is a schematic diagram of a first power supply state of the power supply device 200 of FIG. 5. The power supply device in other embodiment has a first power supply state similar to or the same as that of the power supply device 200, and similarities will not be repeated herein.

As shown in FIG. 10, curve S11 represents the voltage measured at the first electrode terminal 120a of the secondary battery 120. The curve S21 represents the current measured at the first electrode terminal 120a of the secondary battery 120. A line segment of the curve S21 higher than the charge-discharge crossover line L indicates that the secondary battery 120 supplies power to the load 10 (the secondary battery 120 discharges), and a line segment of the curve S21 lower than the charge-discharge crossover line L indicates that the power converter 130 charges the secondary battery 120. Curve S22 represents the current (no feedback control is performed on the charging current $I_C$ of the secondary battery 120) measured at the first electrode terminal of the secondary battery of the conventional power supply device. Curve S31 represents the voltage measured at the first electrode terminal 110a of the fuel cell 110. Curve S32 represents the power output of the fuel cell 110 through the power converter 130. Curve S4 represents the required power of the load 10.

Before entering zone A, an aircraft (for example, the combination of the load and the power supply device) turns on the system and prepares to take off, and the fuel cell 110 has not yet started to supply power. At this time, the curve S31 shows that it is in a high voltage state close to the open-circuit voltage, and the secondary battery 120 is at a fully-charged state. Therefore, the curve S11 shows that the voltage of the secondary battery 120 is close to the output voltage upper-limit-setting value $V_{ref2}$, and the curve S21 shows that only the secondary battery 120 provides a small amount of power required for system operation. When entering zone A, the required power (that is, the curve S4) of the load 10 greatly increases, the terminal voltage of the fuel cell 110 (that is, the curve S31) decreases, and the output power (that is, the curve S31) of the fuel cell 110 through the DC power converter 130 and the output power (that is, the curve S21) of the secondary battery 120 continue to rise. When the output power (the curve S32) of the fuel cell 110 through the DC power converter 130 reaches the highest power of 285 W (watts), the output voltage S31 reaches the lowest point of 45V (volts), so that the output voltage of the output terminal 250e of the control unit 250 is controlled by the third voltage integration value C3 (shown in FIG. 5). Therefore, the output power of the power converter 130 is restricted to prevent the voltage of the fuel cell 110 from continuing to drop. When the required power of the load 10 reaches 600 W, the output power of the fuel cell 110 through the DC power converter 130 is still merely 285 W, and the insufficient 315 W is provided by the discharge of the secondary battery 120. Zone A indicates that the load 10 is in a wind-resistant condition, a condition of resisting wind resist during flight or a condition of steering during flight, the required power of the load 10 is large, and thus the fuel cell 110 supplies power to the load 10 and the secondary battery 120 also supplies power (the curve S21 is higher than the charge-discharge crossover line L in the zone A) to the load 10 for normally working of the load 10.

When the required power of the aircraft returns to a normal state resulted from reaching a certain height or required power of the load being reduced due to downwind flight, for example, the zone B indicates that the load 10 is in a hovering condition against the wind during the flight, the required power of the load 10 fluctuates up and down at the required average power W1 (W1≅230 Watt in this case). Since the required power of the load 10 is less than the maximum output power of the fuel cell 110 through the power converter 130, there is a small amount of power left to charge the secondary battery 120 (curve S21 is lower than the charge-discharge crossover line L in zone B). However, since the charging current $I_C$ does not exceed the maximum charging current $I_{max}$ (in this example, $I_{max}$=1.67 A, it means the maximum charging power is around 80 W) of the secondary battery 120, the first voltage integration value C1 (as shown in FIG. 5) does not affect the output of the power converter 130, the output current $I_O$ at this time is still controlled by the third voltage integration value C3. As like zone A shown in FIG. 10, the output of the fuel cell in the zone B maintains the highest power (285 W) and the lowest voltage (45V). At this time, the power required by the load 10 is around 230 W, and accordingly the secondary battery 120 may receive charging power of around 55 W.

Zone C in FIG. 10 represents the situation where the load 10 further drops below the required average power W1. At this time, the secondary battery 120 still is not required to supply power to the load 10, and the fuel cell 110 could supply enough power to satisfy the load 10. The power converter 130 could provide more charging current $I_C$ to the secondary battery 120 (the curve S21 is lower than the charge-discharge crossover line L in the zone C). When the required power of the load 10 further reduced (for example as shown in the figure, it drops to 180 W from 230 W) due to slow driving, downhill, or falling height of the aircraft, the charging current $I_C$ of the remaining power which is the difference of the original maximum output power of the fuel cell 110 through the power converter subtracting the required power of the load 10 flows to the secondary battery 120 exceeds the maximum charging power of the secondary battery 120 (285 W−180 W=105 W>maximum charging power 80 W), as shown in FIG. 5, the first voltage integration value C1 will continue to drop and affect the output terminal 250e of the control unit 250, so that the output current $I_O$ of the power converter 130 decreases, wherein the curve S32 decreases slightly, and the terminal voltage (that is, the curve S31) increases slightly, thereby reducing the charging current $I_C$ of the secondary battery 120 until the output terminal 140e of the current detection unit 140 is less than the voltage signal upper-limit-setting value $V_{ref1}$, that is, the charging current $I_C$ is not greater than the preset maximum charging current. At this time, the output power of the fuel cell 110 through the power converter 130 is equal to the sum of the required power by the load 10 (around 180 W) and the maximum charging power of the secondary battery 120 (around 80 W), that is around 260 W. It is slightly lower than the maximum output power (285 W) as shown in the zone B. Since the control unit 250 of the power supply device 200 of the disclosed embodiment could limit the charging current $I_C$ of the secondary battery 120 to not exceed the charging current upper-limit-setting value $I_{max}$, it could prevent the power converter 130 from the damage caused by the power converter 130 supplying the overcharging current to the secondary battery 120. Compared with the conventional power supply device, as shown in the curve S22, due to the conventional power supply device having no design of the control unit 250, the charging current of the conventional power supply device is greater than the charging current $I_C$ to the secondary battery 120 by the power converter 130 (the distance between the curve S22 and the charge-discharge crossover line L is greater than the distance between the curve S21 and the charge-discharge crossover line L), and thus it is easy to cause damage to the secondary battery.

Finally, zone D in FIG. 10 represents the state where the load 10 is temporarily stopped. For example, the situations where the aircraft descends due to landing or preparing to take off again, or an electric vehicle (for example, the combination of the load and the power supply device) stops before the traffic light, or an electric airship (for example, the combination of the load and the power supply device) is in a free-flying state. At this time, the required power of the load 10 is the lowest (compared to the other zones A to C), it is lower than 50 W in the most time of zone D. And even down to almost zero in short time, the required power is merely the power which charges the secondary battery 120 (around 80 W as mentioned). Therefore, the zone D is the same as the zone C, and the output power of the power converter 130 is adjusted by the first voltage integration value C1 from the integrator to keep the charging current $I_C$ not exceeding the charging current upper-limit-setting value $I_{max}$. However, for the case of a conventional power supply device without the current detection unit 140 and the feedback regulation design of the control unit 150 or 250, even with the same profile of power requirement by load 10, the fuel cell 110 tends to provide the same output power through the power converter 130 but not response to the situation of the secondary battery 120 charged by the current over the maximum limit $I_{max}$. As the curve S22 in zone D of the FIG. 10, while the power required by load 10 approaches to zero, almost all of the electric power (around 285 W) from the power converter 130 will flow into the secondary battery 120 and then cause the over-current charging of the secondary battery 120. Since the control unit 250 of the power supply device 200 of the disclosed embodiment could limit the charging current $I_C$ to the secondary battery 120 to not exceed the charging current upper-limit-setting value $I_{max}$, it could prevent the secondary battery 120 from the damage caused by the overcharging current supplied by the power converter 130. Compared with the conventional power supply device, as shown in the curve S22, due to the conventional power supply device having no design of the control unit 250, the charging current of the conventional power supply device is greater than the charging current $I_C$ to the secondary battery 120 by the power converter 130 (the distance between the curve S22 and the charge-discharge crossover line L is much greater than the distance between the curve S21 and the charge-discharge crossover line L, especially in the situation like the zone D of the explained example), and thus it is easy to cause damage to the secondary battery.

As described above, due to the control unit 250 of the power supply device 200 in the disclosed embodiment, even if the load 10 is at a low required power (for example, zones C and D as shown in FIG. 10), the power converter 130 could limit the charging current $I_C$ to the secondary battery 120 to not exceed the charging current upper-limit-setting value $I_{max}$, and it could prevent the secondary battery 120 from the damage caused by the overcharging current supplied by the power converter 130.

In addition, as shown in FIG. 10, in the zone D, when the required power of the load 10 is the lowest, as shown by the curve S31, the output voltage of the fuel cell 110 is higher than the output voltage lower-limit-setting value $V_{ref3}$, and it means that the output current of the fuel cell 110 is low, so that the load on the fuel cell 110 is also small, and the battery temperature is also low.

Figure 11:
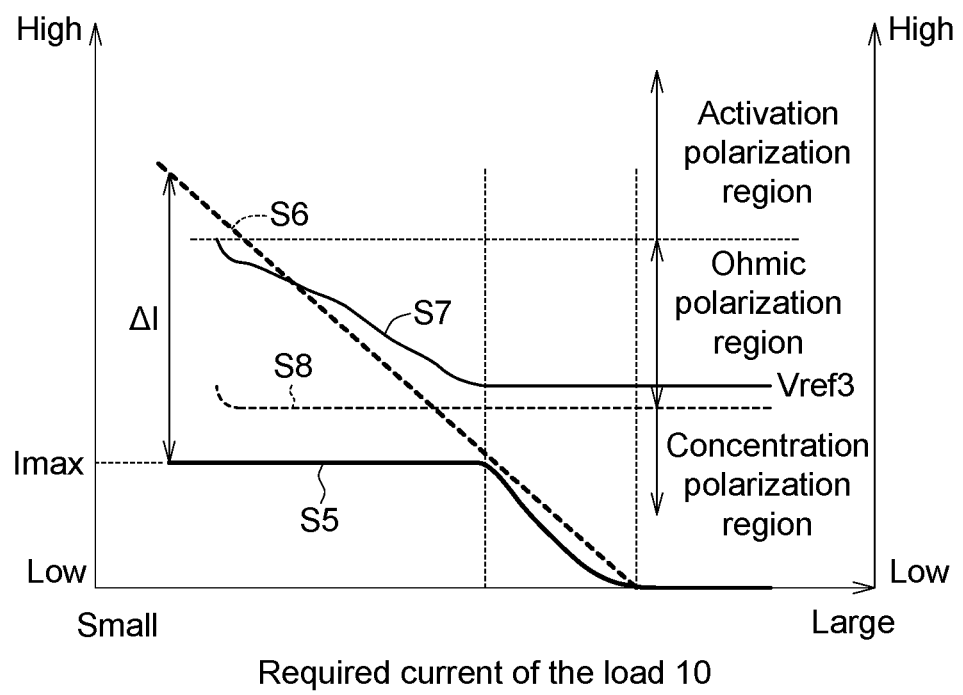
FIG. 11 is a schematic diagram of the second power supply state of the power supply device in FIG. 5.

Referring to FIG. 11, FIG. 11 is a schematic diagram of the second power supply state of the power supply device 200 in FIG. 5. The second power supply state of the power supply device in the other embodiments is similar to or the same as the second power supply state of the power supply device 200, and the similarities will not be repeated here.

The curve S5 represents the current measured at the first electrode terminal 120a of the secondary battery 120, and the curve S6 represents the current measured at the first terminal of the secondary battery of the conventional power supply device. The curve S7 represents the voltage measured at the first electrode terminal 110a of the fuel cell 110, and the curve S8 represents the voltage measured at the output terminal of the fuel cell of the conventional power supply device.

Comparing the curves S5 and S6, it could be seen that when the required power of the load 10 is low, the power converter 130 of the disclosed embodiment could control the charging current $I_C$ of the secondary battery 120 to not exceed the charging current upper-limit-setting value $I_{max}$ (the curve S5), but the power converter of the conventional power supply device could provide the secondary battery with the charging current greater than the charging current upper-limit-setting value $I_{max}$ (the curve S6), and thus it is easy to damage the secondary battery. ΔI represents a charge-current reduction (for better safety) measured at the first electrode terminal 120a of the secondary battery 120 of the power supply device 200 of the disclosed embodiment when the load is low in comparison with of the current measured at the first terminal of the secondary battery of the conventional power supply device.

Comparing curves S7 and S8, it could be seen that when the required power of the load 10 is low, the output voltage of the fuel cell 110 of the embodiment of the present disclosure is greater than the output voltage of the fuel cell of the conventional power supply device, and it means that the output current of the fuel cell 110 of the power supply device 200 is lower (lower burden) than the output current of the fuel cell of the conventional power supply device, and it could reduce the temperature of the fuel cell 110 and increase the lifespan of the fuel cell 110.

In addition, the output voltage upper-limit-setting value $V_{ref2}$ of the power converter 130 is set according to the charging capacity and lifespan consideration of the secondary battery 120. For example, the charging upper-limit voltage of cell lithium battery whose positive electrode material is nickel-manganese-cobalt ternary material (NMC) generally ranges between 4.0V and 4.3V. A battery module used in a 48V power system with 12 unit cells connected in series could have the charging upper-limit voltage in the range between 48V and 51.6V. Generally, the higher the set charging upper-limit voltage is, the larger the available capacity is; however, if the lifespan of the secondary battery is considered, a lower charging voltage should be selected in the range with sufficient capacity. On the other hand, the output voltage lower-limit-setting value $V_{ref3}$ of the fuel cell 110 is set in consideration of the operating voltage of the fuel cell 110. Generally speaking, in teams of the characteristics of the proton exchange membrane (PEM) fuel cell, the voltage of 0.6V to 0.75V in the unit cell is an ideal ohmic polarization region. Above this region, the output power will drop sharply; below this region, it will enter the concentration polarization region and generate much more waste heat, and thus it will easily cause the fuel cell stack to overheat and cause serious performance degradation. Therefore, as shown in FIG. 11, the output voltage lower-limit-setting value $V_{ref3}$ of the fuel cell 110 is usually set in a region between the activation polarization region and the concentration polarization region, so that the output voltage of the fuel cell 110 operates at the ideal ohmic polarization region.

To sum up, the embodiments of the present disclosure provide a power supply device including the fuel cell and the secondary battery. In an embodiment, the fuel cell could provide the power required by the load, and the secondary battery could make up for the insufficient portion of the required power. The power supply device further includes the current detection unit for detecting the terminal current of the secondary battery. When the terminal current of the secondary battery is greater than or equal to the charging current upper-limit-setting value, the power converter reduces the output current for protecting the secondary battery. When the terminal current of the secondary battery is less than the charging current upper-limit-setting value, the power converter could increase the output current for charging the secondary battery and/or supplying the power to the load.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A power supply device, comprising:
   a fuel cell;
   a secondary battery;
   a power converter coupling the fuel cell with the secondary battery, and configured to convert current output by the fuel cell into an output current;
   a current detection unit coupling the power converter with the secondary battery and configured to detect charging current of the output current which is transmitted to the secondary battery;
   a control unit coupling the current detection unit with the power converter and configured to:
      when the charging current is greater than a charging current upper-limit-setting value of the secondary battery, outputting a down-adjustment signal to the power converter for reducing the output current; and
      when the charging current is less than the charging current upper-limit-setting value, outputting an up-adjustment signal to the power converter for increasing the output current.

2. The power supply device according to claim 1, wherein the control unit comprises:
   a first comparator having a first comparison reference terminal, a first comparison input terminal and a first comparison output terminal; and
   a first integrator coupling the first comparator and the power converter;
   wherein the first comparison input terminal is coupled to the current detection unit for receiving a voltage signal value corresponding to the charging current from the current detection unit, the first comparison output terminal is coupled to the first integrator, the first comparison reference terminal refers to a voltage signal upper-limit-setting value corresponding to the charging current upper-limit-setting value, the first comparator is configured to output a first comparison result voltage value of the voltage signal value corresponding to the charging current and the voltage signal upper-limit-setting value corresponding to the charging current upper-limit-setting value through the first comparison output terminal, the first integrator is configured to integrate the first comparison result voltage value at each time point into a first voltage integration value, and the power converter is configured to control the output current according to the first voltage integration value.

3. The power supply device of claim 2, wherein the power converter has an output terminal, and the control unit comprises:
   a second comparator having a second comparison reference terminal, a second comparison input terminal and a second comparison output terminal; and
   a second integrator coupling the second comparator with the power converter;
   wherein the second comparison input terminal is coupled to the output terminal of the power converter for detecting an output voltage of the power converter, the second comparison output terminal is coupled to the second integrator, the second comparison reference terminal refers to a output voltage upper-limit-setting value of the power converter, the second comparator is configured to output a second comparison result voltage value of a value of the output voltage and the output voltage upper-limit-setting value through the second comparison output terminal, the second integrator is configured to integrate the second comparison result voltage value at each time point into a second voltage integration value, and the power converter is configured to control the output current according to the second voltage integration value.

4. The power supply device according to claim 3, wherein the control unit comprises:
   a first diode coupling the power converter with the first integrator; and
   a second diode coupling the power converter and the second integrator;
   wherein the first diode and the second diode are electrically connected to a DC voltage level in common, and the power converter is configured to control the output current according the minimum one of the first voltage integration value and the second voltage integration value.

5. The power supply device according to claim 3, wherein the power converter has an input terminal coupled to the fuel cell, and the control unit comprises:
   a third comparator having a third comparison reference terminal, a third comparison input terminal and a third comparison output terminal; and
   a third integrator, coupled to the third comparator and the power converter;
   wherein the third comparison input terminal couples the input terminal of the power converter for detecting an input voltage of the power converter, the third comparison output terminal is coupled to the third integrator, the third comparison reference terminal refers to an output voltage lower-limit-setting value of the fuel cell, the third comparator is configured output a third comparison result voltage value of a value of the input voltage and the output voltage lower-limit-setting value through the third comparison output terminal, the third integrator is configured to integrate the third comparison result voltage value at each time point into a third voltage integration value, and the power converter is configured to control the output current according to the third voltage integration value.

6. The power supply device according to claim 5, wherein the control unit comprises:
   a first diode coupling the power converter with the first integrator;
   a second diode coupling the power converter with the second integrator; and
   a third diode coupling the power converter with the third integrator;
   wherein the first diode, the second diode and the third diode are electrically connected to a DC voltage level in common, and the power converter is configured to control the output current according to the minimum one of the first voltage integration value, the second voltage integration value and the third voltage integration value.

7. The power supply device of claim 1, wherein the secondary battery has a maximum charging power, and the charging current upper-limit-setting value is not greater than a maximum charging current upper-limit value corresponding to the maximum charging power.

8. The power supply device of claim 1, wherein the power converter has a maximum output power, the secondary battery has a maximum charging power, and the maximum charging power is less than the maximum output power of the power converter.

9. The power supply device according to claim 1, comprising:
a plurality of power supply modules each comprising:
the fuel cell coupled to the secondary battery;
the power converter coupled to the current detection unit; and
the control unit coupled to the current detection unit.

10. The power supply device according to claim 1, comprises:
a reference voltage regulator coupling the secondary battery with the current detection unit and configured to determine a voltage signal upper-limit-setting value corresponding to the charging current upper-limit-setting value according to at least one of a voltage signal value of the charging current, a battery voltage of the secondary battery and a battery temperature of the secondary battery.

11. The power supply device according to claim 1, comprising a plurality of the current detection units, a plurality of the secondary batteries and a plurality of comparators; each current detection unit is coupled to the corresponding secondary battery, each comparator has a comparator input terminal and a comparator output terminal, each comparator input terminal is coupled to the corresponding current detection unit, and each comparator output terminals is coupled to the control unit.

12. The power supply device of claim 1, comprising a plurality of the power converters, and the power converters are connected between the fuel cell and the current detection unit in parallel.

13. The power supply device according to claim 1, wherein the power converter has an output terminal, the control unit has an input terminal, the current detection unit has a first terminal, a second terminal and an output terminal, the first terminal is coupled to the output terminal of the power converter, the second terminal is coupled to the secondary battery, and the output terminal of the current detection unit is coupled to the input terminal of the control unit.

14. A power supplying method, comprising:
converting current output by a fuel cell of a power supply device into an output current by a power converter of the power supply device, wherein the power converter couples the fuel cell with a secondary battery;
detecting a charging current of the output current transferred to the secondary battery from the power converter by a current detection unit of the power supply device, wherein the current detection unit couples the power converter with the secondary battery;
outputting a down-adjustment signal to the power converter for reducing the output current by a control unit of the power supply device when the charging current is greater than a charging current upper-limit-setting value of the secondary battery, wherein the control unit couples the current detection unit with the power converter; and
outputting an up-adjustment signal to the power converter for increasing the output current by the control unit when the charging current is less than the charging current upper-limit-setting value.

15. The power supplying method described in claim 14, further comprising:
outputting a first comparison result voltage value of a voltage signal value corresponding to the charging current and a voltage signal upper-limit-setting value corresponding to the charging current upper-limit-setting value;
integrating a plurality of the first comparison result voltage values to obtain a first voltage integration value; and
outputting the down-adjustment signal or the up-adjustment signal to the power converter according to the first voltage integration value.

16. The power supplying method according to claim 15, further comprising:
outputting a second comparison result voltage value of a value of an output voltage of the power converter and an output voltage upper-limit-setting value of the power converter;
integrating a plurality of the second comparison result voltage values to obtain a second voltage integration value; and
outputting the down-adjustment signal or the up-adjustment signal to the power converter according to the minimum one of the first voltage integration value and the second voltage integration value.

17. The power supplying method described in claim 16, further comprising:
outputting a third comparison result voltage value of a value of an input voltage of the power converter and an output voltage lower-limit-setting value of the fuel cell;
integrating a plurality of the third comparison result voltage values to obtain a third voltage integration value; and
outputting the down-adjustment signal or the up-adjustment signal to the power converter according to the minimum one of the first voltage integration value, the second voltage integration value and the third voltage integration value.

* * * * *